US008290310B2

(12) United States Patent
Sono

(10) Patent No.: US 8,290,310 B2
(45) Date of Patent: Oct. 16, 2012

(54) IMAGE PROCESSING APPARATUS AND METHOD, PROGRAM, AND RECORDING MEDIUM

(75) Inventor: Koichi Sono, Kanagawa (JP)

(73) Assignee: Sony Corporation (JP)

( * ) Notice: Subject to any disclaimer, the term of this patent is extended or adjusted under 35 U.S.C. 154(b) by 1002 days.

(21) Appl. No.: 12/313,167

(22) Filed: Nov. 18, 2008

(65) Prior Publication Data

US 2009/0142000 A1 Jun. 4, 2009

(30) Foreign Application Priority Data

Dec. 4, 2007 (JP) ................................ P2007-313091

(51) Int. Cl.
*G06K 9/00* (2006.01)
*G06K 9/32* (2006.01)
*G06K 9/40* (2006.01)
*G06K 9/46* (2006.01)
*G06K 9/66* (2006.01)
*G06K 1/00* (2006.01)
*G06K 15/02* (2006.01)
*G06F 15/00* (2006.01)
*G09G 5/02* (2006.01)
*H04N 1/40* (2006.01)
*H04N 7/01* (2006.01)
*H04N 11/20* (2006.01)

(52) U.S. Cl. ........ 382/300; 382/169; 382/192; 382/254; 358/1.2; 358/3.01; 345/600; 348/254; 348/441

(58) Field of Classification Search .................. 382/169, 382/181, 190, 192–193, 254, 260, 263–264, 382/266, 274–276, 293–300; 348/222.1, 348/240.99–240.02, 254, 441, 448–452; 345/600–602; 358/1.1, 1.2, 1.9, 2.1, 3.01
See application file for complete search history.

(56) References Cited

U.S. PATENT DOCUMENTS

| 6,091,860 | A  | * | 7/2000 | Dimitri ......................... 382/299 |
| 6,606,099 | B2 | * | 8/2003 | Yamada ......................... 345/690 |
| 6,771,815 | B2 | * | 8/2004 | Yang et al. .................... 382/169 |
| 7,079,698 | B2 | * | 7/2006 | Kobayashi .................... 382/250 |
| 2002/0039452 | A1 | * | 4/2002 | Suzuki et al. ................. 382/263 |
| 2002/0097921 | A1 | * | 7/2002 | Wakisawa et al. ............. 382/300 |

(Continued)

FOREIGN PATENT DOCUMENTS

JP 7-249118 A 9/1995

(Continued)

*Primary Examiner* — Anand Bhatnagar
*Assistant Examiner* — Nathan Bloom
(74) *Attorney, Agent, or Firm* — Lerner, David, Littenberg, Krumholz & Mentlik, LLP

(57) ABSTRACT

An image processing apparatus includes a computation unit that determines an interpolation process starting point and gradient on the basis of a change point at which a difference between pixel values of adjacent pixels of an image signal is greater than zero and is less than or equal to a predetermined threshold value, wherein a position of a pixel scanned earlier or later than the change point by substantially one-half a continuous width of pixels having an identical grayscale value is set as the starting point and the gradient is determined based on a difference between pixel values before and after the change point and the continuous width, and a conversion unit that converts pixel values of the image signal on the basis of the determined starting point and gradient so that a grayscale change from the interpolation process starting point in the image signal corresponds to the gradient.

9 Claims, 15 Drawing Sheets

U.S. PATENT DOCUMENTS

| | | | |
|---|---|---|---|
| 2005/0031203 A1* | 2/2005 | Fukuda | 382/176 |
| 2005/0237340 A1* | 10/2005 | Ueno et al. | 345/600 |
| 2006/0176530 A1 | 8/2006 | Obara | |
| 2008/0144952 A1* | 6/2008 | Chen et al. | 382/239 |

FOREIGN PATENT DOCUMENTS

| | | |
|---|---|---|
| JP | 8-237669 A | 9/1996 |
| JP | 9-246985 A | 9/1997 |
| JP | 2005-221593 A | 8/2005 |
| JP | 2006-222564 A | 8/2006 |
| JP | 2006-245752 A | 9/2006 |
| JP | 2007-158847 A | 6/2007 |
| JP | 2007-181189 A | 7/2007 |
| JP | 2007-213460 A | 8/2007 |
| JP | 2007-221569 A | 8/2007 |

* cited by examiner

FIG. 1
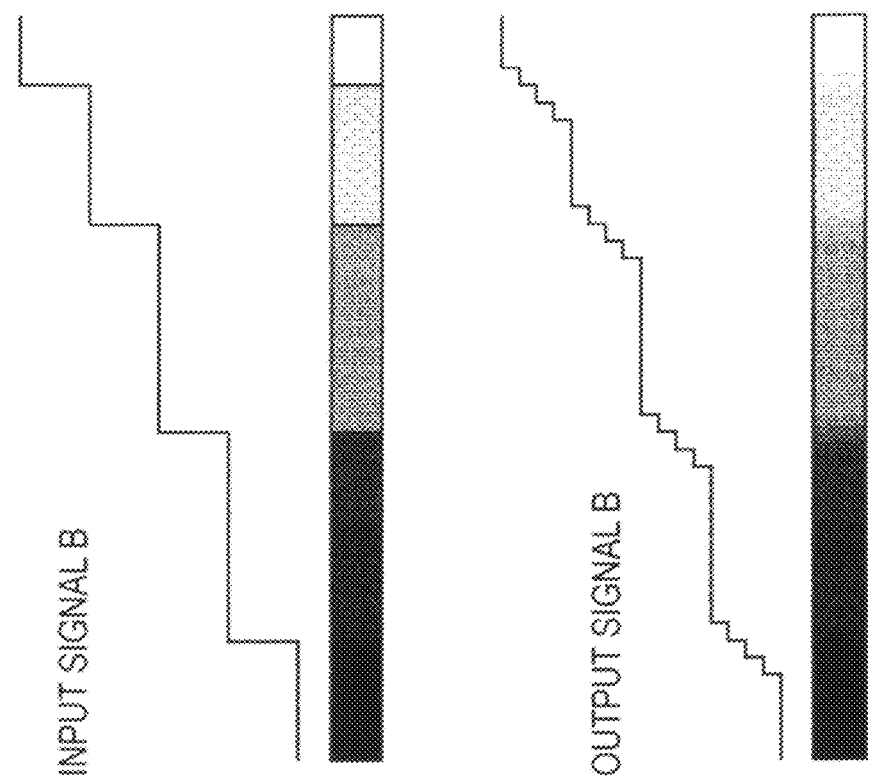
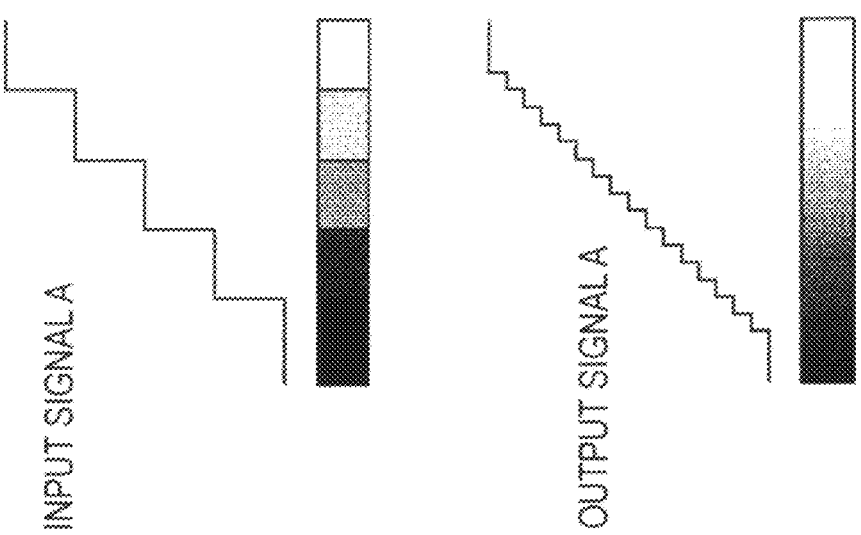

IMAGE PROCESSING APPARATUS AND METHOD, PROGRAM, AND RECORDING MEDIUM

CROSS REFERENCES TO RELATED APPLICATIONS

The present application claims priority from Japanese Patent Application No. JP 2007-313091, filed in the Japanese Patent Office on Dec. 4, 2007, the entire content of which is incorporated herein by reference.

BACKGROUND OF THE INVENTION

1. Field of the Invention

The present invention relates to an image processing apparatus and method, a program, and a recording medium. More specifically, the present invention relates to an image processing apparatus and method, a program, and a recording medium which are suitable for use in the interpolation of grayscale values of an image.

2. Description of the Related Art

With the recent improvement in the performance of grayscale representation of liquid crystal display devices or plasma display panels (PDPs) used for television receivers, 10-bit or higher grayscale representation has been available. Broadcast signals or video signals such as digital versatile disc (DVD) video signals, on the other hand, are generally transmitted in 8 bits. Thus, the characteristics of such signals may not sufficiently be utilized in display devices with improved capabilities of providing 10-bit or higher grayscale representation, and, particularly, in a region where the grayscale gradually changes, stepped edges may become noticeable in an area where the grayscale changes and an undesired striped pattern may appear.

In order to prevent the occurrence of such display defects, a technique for interpolating grayscale values using a plurality of frames has been developed (see, for example, Japanese Unexamined Patent Application Publication No. 2006-222564).

SUMMARY OF THE INVENTION

With the use of the technique disclosed in Japanese Unexamined Patent Application Publication No. 2006-222564, for example, in response to the input of an 8-bit input signal A shown in FIG. 1, a 10-bit output signal A is obtained, in which the occurrence of an undesired striped pattern caused by noticeable stepped edges in an area where the grayscale changes can be prevented.

In the technique disclosed in Japanese Unexamined Patent Application Publication No. 2006-222564, however, a frame memory is necessary because interpolation is carried out using a plurality of frames. Further, the greater the number of grayscale values to be interpolated, the greater the number of frames to be obtained by division for display, resulting in a higher risk of defects visually observed as "flicker".

In the technique disclosed in Japanese Unexamined Patent Application Publication No. 2006-222564, furthermore, an accurate interpolation may not necessarily be achieved in a moving image in which a grayscale change point moves.

In the technique disclosed in Japanese Unexamined Patent Application Publication No. 2006-222564, moreover, since portions around change points in all image areas are interpolated at the same rate, areas where the degree of change (or gradient) differs are also interpolated using the same gradient, and a problem may occur. When a distance between grayscale change points is relatively short, as in the case of the 8-bit input signal A and 10-bit output signal A shown in FIG. 1, the occurrence of a striped pattern can be prevented. When a distance between grayscale change points is significantly large, however, a striped pattern may occur in an output signal. Specifically, when an 8-bit input signal B shown in FIG. 1 is input, a 10-bit output signal B obtained using the technique disclosed in Japanese Unexamined Patent Application Publication No. 2006-222564 contains a striped pattern.

It is therefore desirable to prevent the occurrence of an undesired striped pattern without causing defects such as flicker even in a case where a distance between grayscale change points is significantly large.

According to an embodiment of the present invention, an image processing apparatus includes computation means for determining an interpolation process starting point and an interpolation process gradient by comparing, when an image signal has a change point at which a difference between pixel values of adjacent pixels of the image signal is greater than zero and is less than or equal to a predetermined threshold value, a first continuous width of pixels having an identical grayscale value and scanned earlier than the change point with a second continuous width of pixels having an identical grayscale value and scanned later than the change point, setting, when the first continuous width is smaller than the second continuous width, a position of a pixel scanned earlier by substantially one-half the first continuous width than the change point as the interpolation process starting point, and determining the interpolation process gradient on the basis of a difference between pixel values before and after the change point and the first continuous width, and setting, when the first continuous width is greater than the second continuous width, a position of a pixel scanned earlier by substantially one-half the second continuous width than the change point as the interpolation process starting point, and determining the interpolation process gradient on the basis of a difference between pixel values before and after the change point and the second continuous width; and conversion means for converting pixel values of the image signal on the basis of the interpolation process starting point and interpolation process gradient determined by the computation means so that a grayscale change from the interpolation process starting point in the image signal has a value in accordance with the interpolation process gradient.

The image signal can be a converted image signal obtained by converting an N-bit image signal into an M-bit image signal.

The predetermined threshold value can be equal to a value represented by an (M−N)-th power of 2.

The image processing apparatus can further include horizontal-component noise removing means for removing a noise component in a horizontal direction of the image signal, and the computation means can execute a computation process on the basis of the image signal in which the noise component in the horizontal direction has been removed by the horizontal-component noise removing means.

The image processing apparatus can further include vertical-component noise removing means for removing a noise component in a vertical direction of the image signal, and the computation means can execute a computation process on the basis of the image signal in which the noise component in the vertical direction has been removed by the vertical-component noise removing means.

The image processing apparatus can further include two data storage means each capable of storing computation results for every horizontal line which are obtained by the computation means; the computation means and the conversion means can execute processing of the image signal for every horizontal line; and when one of the two data storage means is recording computation results obtained by the computation means, the conversion means can convert pixel values of the image signal using computation results for a preceding horizontal line which are obtained by the computation means and which are stored in the other data storage means.

According to another embodiment of the present invention, an image processing method for an image processing apparatus that executes image processing to provide display of an image signal includes the steps of obtaining an image signal; determining whether or not the image signal has a change point at which a difference between pixel values of adjacent pixels of the image signal is greater than zero and is less than or equal to a predetermined threshold value; comparing, when the image signal has the change point, a first continuous width of pixels having an identical grayscale value and scanned earlier than the change point with a second continuous width of pixels having an identical grayscale value and scanned later than the change point; setting, when the first continuous width is smaller than the second continuous width, a position of a pixel scanned earlier by substantially one-half the first continuous width than the change point as an interpolation process starting point, and determining an interpolation process gradient on the basis of a difference between pixel values before and after the change point and the first continuous width; setting, when the first continuous width is greater than the second continuous width, a position of a pixel scanned earlier by substantially one-half the second continuous width than the change point as an interpolation process starting point, and determining an interpolation process gradient on the basis of a difference between pixel values before and after the change point and the second continuous width; and converting pixel values of the image signal on the basis of the obtained interpolation process starting point and interpolation process gradient so that a grayscale change from the interpolation process starting point in the image signal has a value in accordance with the interpolation process gradient.

According to still another embodiment of the present invention, a program for causing a computer to execute image processing to provide display of an image signal causes the computer to execute a process including the steps of obtaining an image signal; determining whether or not the image signal has a change point at which a difference between pixel values of adjacent pixels of the image signal is greater than zero and is less than or equal to a predetermined threshold value; comparing, when the image signal has the change point, a first continuous width of pixels having an identical grayscale value and scanned earlier than the change point with a second continuous width of pixels having an identical grayscale value and scanned later than the change point; setting, when the first continuous width is smaller than the second continuous width, a position of a pixel scanned earlier by substantially one-half the first continuous width than the change point as an interpolation process starting point, and determining an interpolation process gradient on the basis of a difference between pixel values before and after the change point and the first continuous width; setting, when the first continuous width is greater than the second continuous width, a position of a pixel scanned earlier by substantially one-half the second continuous width than the change point as an interpolation process starting point, and determining an interpolation process gradient on the basis of a difference between pixel values before and after the change point and the second continuous width; and converting pixel values of the image signal on the basis of the obtained interpolation process starting point and interpolation process gradient so that a grayscale change from the interpolation process starting point in the image signal has a value in accordance with the interpolation process gradient.

According to an embodiment of the present invention, therefore, an image signal is obtained; it is determined whether or not the image signal has a change point at which a difference between pixel values of adjacent pixels of the image signal is greater than zero and is less than or equal to a predetermined threshold value; when the image signal has the change point, a first continuous width of pixels having an identical grayscale value and scanned earlier than the change point is compared with a second continuous width of pixels having an identical grayscale value and scanned later than the change point; when the first continuous width is smaller than the second continuous width, a position of a pixel scanned earlier by substantially one-half the first continuous width than the change point is set as an interpolation process starting point, and an interpolation process gradient is determined on the basis of a difference between pixel values before and after the change point and the first continuous width; when the first continuous width is greater than the second continuous width, a position of a pixel scanned earlier by substantially one-half the second continuous width than the change point is set as an interpolation process starting point, and an interpolation process gradient is determined on the basis of a difference between pixel values before and after the change point and the second continuous width; and pixel values of the image signal are converted on the basis of the obtained interpolation process starting point and interpolation process gradient so that a grayscale change from the interpolation process starting point in the image signal has a value in accordance with the interpolation process gradient.

According to an embodiment of the present invention, an image processing apparatus includes computation means for determining an interpolation process starting point and an interpolation process gradient by setting, when an image signal has a change point at which a difference between pixel values of adjacent pixels of the image signal is greater than zero and is less than or equal to a predetermined threshold value, on the basis of a first continuous width of pixels having an identical grayscale value and scanned earlier than the change point, a position of a pixel scanned earlier by substantially one-half the first continuous width than the change point as the interpolation process starting point, and determining the interpolation process gradient on the basis of a difference between pixel values before and after the change point and a sum of the first continuous width and a second continuous width of pixels having an identical grayscale value and scanned later than the change point; and conversion means for converting pixel values of the image signal on the basis of the interpolation process starting point and interpolation process gradient determined by the computation means so that a grayscale change from the interpolation process starting point in the image signal has a value in accordance with the interpolation process gradient.

The image signal can be a converted image signal obtained by converting an N-bit image signal into an M-bit image signal.

The predetermined threshold value can be equal to a value represented by an (M−N)-th power of 2.

The image processing apparatus can further include horizontal-component noise removing means for removing a noise component in a horizontal direction of the image signal, and the computation means can execute a computation process on the basis of the image signal in which the noise component in the horizontal direction has been removed by the horizontal-component noise removing means.

The image processing apparatus can further include vertical-component noise removing means for removing a noise component in a vertical direction of the image signal, and the computation means can execute a computation process on the basis of the image signal in which the noise component in the vertical direction has been removed by the vertical-component noise removing means.

The image processing apparatus can further include two data storage means each capable of storing computation results for every horizontal line which are obtained by the computation means; the computation means and the conversion means can execute processing of the image signal for every horizontal line; and when one of the two data storage means is recording computation results obtained by the computation means, the conversion means can convert pixel values of the image signal using computation results for a preceding horizontal line which are obtained by the computation means and which are stored in the other data storage means.

According to another embodiment of the present invention, an image processing method for an image processing apparatus that executes image processing to provide display of an image signal includes the steps of obtaining an image signal; determining whether or not the image signal has a change point at which a difference between pixel values of adjacent pixels of the image signal is greater than zero and is less than or equal to a predetermined threshold value; setting, when the image signal has the change point, on the basis of a first continuous width of pixels having an identical grayscale value and scanned earlier than the change point, a position of a pixel scanned earlier by substantially one-half the first continuous width than the change point as an interpolation process starting point, and determining an interpolation process gradient on the basis of a difference between pixel values before and after the change point and a sum of the first continuous width and a second continuous width of pixels having an identical grayscale value and scanned later than the change point; and converting pixel values of the image signal on the basis of the interpolation process starting point and the interpolation process gradient so that a grayscale change from the interpolation process starting point in the image signal has a value in accordance with the interpolation process gradient.

According to still another embodiment of the present invention, a program for causing a computer to execute image processing to provide display of an image signal causes the computer to execute a process including the steps of obtaining an image signal; determining whether or not the image signal has a change point at which a difference between pixel values of adjacent pixels of the image signal is greater than zero and is less than or equal to a predetermined threshold value; setting, when the image signal has the change point, on the basis of a first continuous width of pixels having an identical grayscale value and scanned earlier than the change point, a position of a pixel scanned earlier by substantially one-half the first continuous width than the change point as an interpolation process starting point, and determining an interpolation process gradient on the basis of a difference between pixel values before and after the change point and a sum of the first continuous width and a second continuous width of pixels having an identical grayscale value and scanned later than the change point; and converting pixel values of the image signal on the basis of the interpolation process starting point and the interpolation process gradient so that a grayscale change from the interpolation process starting point in the image signal has a value in accordance with the interpolation process gradient.

According to an embodiment of the present invention, therefore, an image signal is obtained; it is determined whether or not the image signal has a change point at which a difference between pixel values of adjacent pixels of the image signal is greater than zero and is less than or equal to a predetermined threshold value; when the image signal has the change point, on the basis of a first continuous width of pixels having an identical grayscale value and scanned earlier than the change point, a position of a pixel scanned earlier by substantially one-half the first continuous width than the change point is set as an interpolation process starting point, and an interpolation process gradient is determined on the basis of a difference between pixel values before and after the change point and a sum of the first continuous width and a second continuous width of pixels having an identical grayscale value and scanned later than the change point; and pixel values of the image signal are converted on the basis of the interpolation process starting point and the interpolation process gradient so that a grayscale change from the interpolation process starting point in the image signal has a value in accordance with the interpolation process gradient.

The term "network" refers to a mechanism over which at least two apparatuses are connected so that one of the apparatuses can transmit information to another apparatus. Apparatuses that communicate with each other over a network may be independent apparatuses or internal blocks constituting a single apparatus.

The term "communication" means wireless communication or wired communication, or may be communication including wireless communication and wired communication, that is, communication in which wireless communication is performed for a given range and wired communication is performed for another range. Alternatively, communication in which communication from a first apparatus to a second apparatus is performed via wired communication and communication from the second apparatus to the first apparatus is performed via wireless communication may be used.

The image processing apparatus may be an independent apparatus or a block that performs image processing, such as a recording and reproducing apparatus, a television receiver, a set-top box, or an information processing apparatus.

According to the embodiments of the present invention, therefore, an input image signal can be converted and, specifically, the occurrence of an undesired striped pattern can be prevented without causing defects such as flicker even in a case where a distance between grayscale change points is significantly large.

BRIEF DESCRIPTION OF THE DRAWINGS

FIG. 1 is a diagram showing a 10-bit output signal obtained when an 8-bit input signal is input;

DESCRIPTION OF THE PREFERRED EMBODIMENTS

Embodiments of the present invention will be described hereinafter with reference to the drawings.

Figure 2:
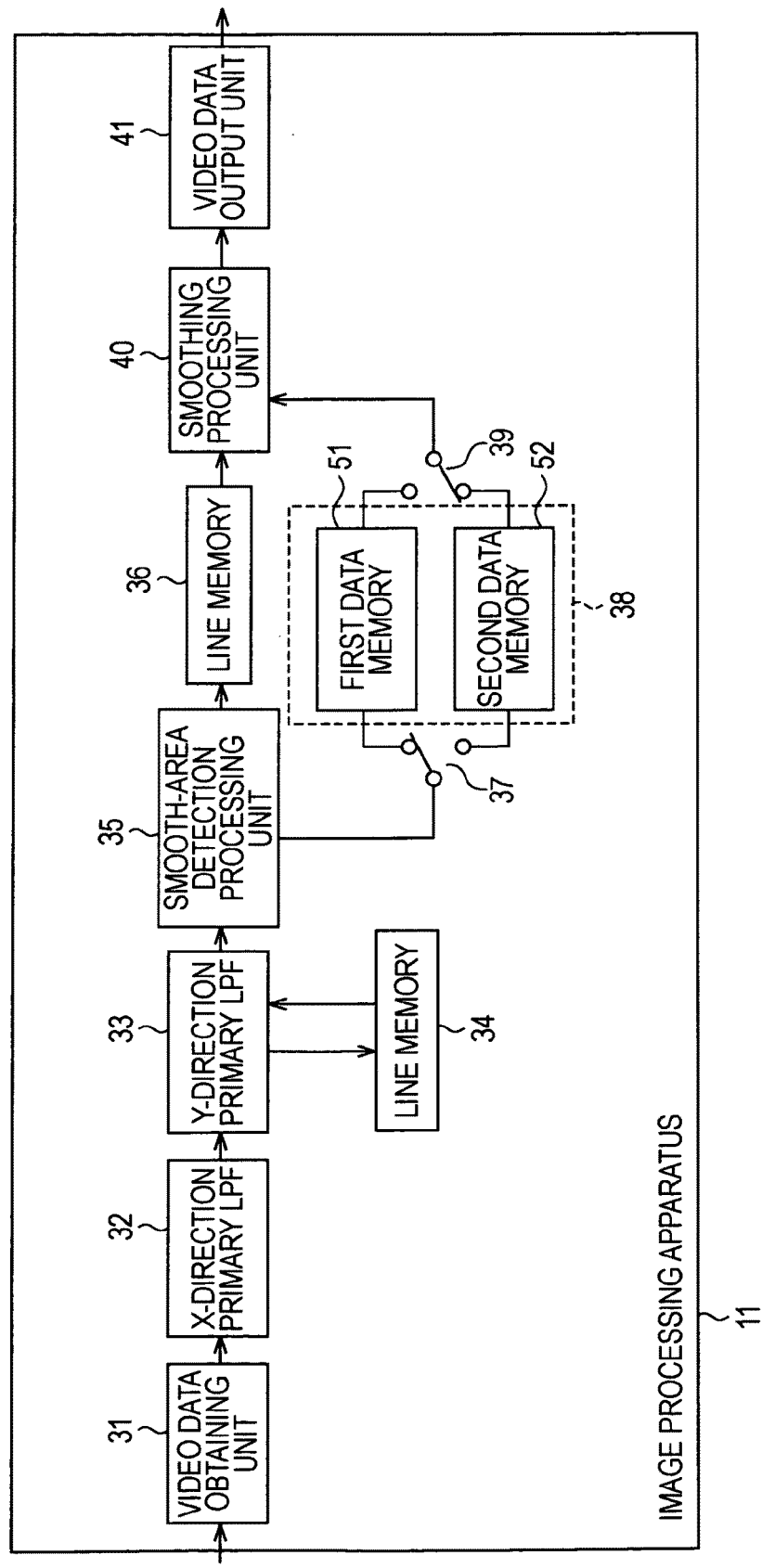
FIG. 2 is a block diagram showing a structure of an image processing apparatus.

FIG. 2 is a block diagram showing a structure of an image processing apparatus 11.

The image processing apparatus 11 includes a video data obtaining unit 31, an X-direction primary low-pass filter (LPF) 32, a Y-direction primary low-pass filter 33, a line memory 34, a smooth-area detection processing unit 35, a line memory 36, a switch 37, a data memory 38, a switch 39, a smoothing processing unit 40, and a video data output unit 41.

The image processing apparatus 11 may constitute an apparatus by itself, or may be incorporated in another apparatus such as a recording and reproducing apparatus, a television receiving apparatus, or a set-top box.

The video data obtaining unit 31 obtains video data and outputs a 10-bit digital video signal to the X-direction primary low-pass filter 32. For example, when an 8-bit digital video signal is supplied, the video data obtaining unit 31 converts the input 8-bit digital video signal into a 10-bit digital video signal and outputs the 10-bit digital video signal. For example, when an analog video signal is supplied, the video data obtaining unit 31 quantizes the input analog video signal into a 10-bit digital video signal and outputs the 10-bit digital video signal. For example, when a 10-bit digital video signal is supplied, the video data obtaining unit 31 directly outputs the input 10-bit digital video signal.

The X-direction primary low-pass filter 32 removes noise in horizontal components of the input video signal. A process executed by the X-direction primary low-pass filter 32 will be described in detail below with reference to FIG. 3.

The Y-direction primary low-pass filter 33 removes noise in vertical components of the input video signal. A process executed by the Y-direction primary low-pass filter 33 will be described in detail below with reference to FIG. 6.

The line memory 34 may be a line memory used when the Y-direction primary low-pass filter 33 compares grayscale values of pixels adjacent in the Y direction.

The smooth-area detection processing unit 35 determines whether or not the grayscale of the supplied signal gradually changes, and calculates a grayscale interpolation starting point and gradient data. A process executed by the smooth-area detection processing unit 35 will be described in detail below with reference to FIGS. 7 and 8.

The line memory 36 is configured to store data for one line until the process of the smooth-area detection processing unit 35 has been completed.

The switch 37 is configured to supply the grayscale interpolation starting point and gradient data obtained by the process of the smooth-area detection processing unit 35 alternately to a first data memory unit 51 and a second data memory unit 52 included in the data memory 38 on, for example, line-by-line basis.

The data memory 38 is composed of two memory units having the same structure, i.e., the first data memory unit 51 and the second data memory unit 52, and is configured such that when data supplied from the switch 37 is being written into one of the memory units, data is read from the other memory unit and is supplied to the smoothing processing unit 40 through the switch 39. The writing and reading operations are executed alternately on, for example, a line-by-line basis.

The switch 39 is configured to supply data read from one of the first data memory unit 51 and the second data memory unit 52 included in the data memory 38 to the smoothing processing unit 40 on, for example, a line-by-line basis.

The smoothing processing unit 40 performs grayscale interpolation of pixel data for one line, which is read from the line memory 36, using data read from the data memory 38, and supplies the image data subjected to the grayscale interpolation to the video data output unit 41. A process executed by the smoothing processing unit 40 will be described in detail below with reference to FIGS. 9 and 10.

The video data output unit 41 outputs the image data obtained using grayscale interpolation to, for example, a display device or any other suitable device for display, or outputs it to another device connected via wired or wireless connection.

In FIG. 1, the image processing apparatus 11 is configured such that noise is removed using the X-direction primary low-pass filter 32 and the Y-direction primary low-pass filter 33 from the video data obtained by the video data obtaining unit 31. Alternatively, for example, if noise is not taken into consideration, the image processing apparatus 11 may not necessarily include the X-direction primary low-pass filter 32 or the Y-direction primary low-pass filter 33.

Figure 3:
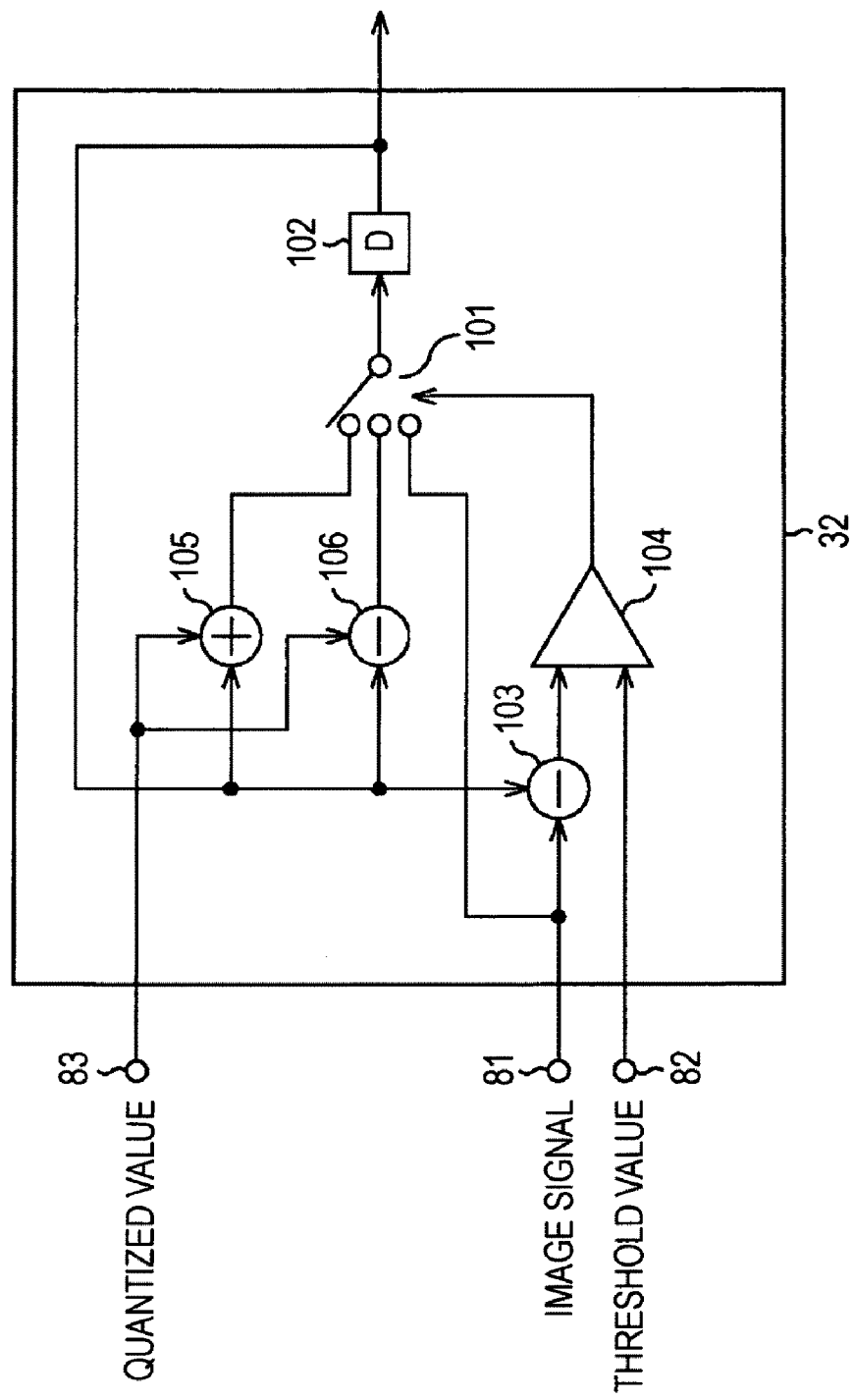
FIG. 3 is a block diagram showing an X-direction primary low-pass filter shown in FIG. 1.

FIG. 3 is a diagram showing a structure of the X-direction primary low-pass filter 32 in more detail. It is assumed that pixel signals are supplied to the X-direction primary low-pass filter 32 in a horizontally sequentially scanned order (a raster scan order) from the upper left pixel of pixel data for one frame, and are processed.

A 10-bit digital pixel signal of each pixel of the video data, which is supplied from the video data obtaining unit 31, is supplied to a switch 101 from an input terminal 81 and is also supplied to a subtraction unit 103. The output of the switch 101 is determined according to a comparison result obtained by a comparison processing unit 104 (which will be described below). A delayed signal that is supplied to a delay unit 102 from the switch 101 and that is delayed is supplied to the Y-direction primary low-pass filter 33 and is also supplied to the subtraction unit 103 to calculate a difference between the delayed signal and the signal of the current pixel supplied from the input terminal 81. The subtraction result and a signal indicating which of the signal of the current pixel and the delayed signal is greater are supplied to the comparison processing unit 104. A predetermined threshold value input from the input terminal 82 is also supplied to the comparison processing unit 104.

The predetermined threshold value may be a desired value which depends on a bit difference representing the difference between the number of bits of the video data output from the video data obtaining unit 31 (in this example, 10 bits) and the number of bits of the original image material (in this example, for example, 8 bits) before the video data is converted into 10-bit data. Since binary calculation is performed here, a threshold value which is a power of 2 is preferably used. Thus, the predetermined threshold value is preferably a (bit difference)-th power of 2. For example, when the video data output from the video data obtaining unit 31 has 10 bits and when the original image material before the video data is converted into 10-bit data has 8 bits, the predetermined threshold value is preferably the square of 2, that is, 4. For example, when the video data output from the video data obtaining unit 31 has 12 bits and when the original image material before the video data is converted into 12-bit data has 8 bits, the predetermined threshold value is preferably the biquadrate of 2, that is, 16.

If the video data output from the video data obtaining unit 31 has the same number of bits as the original image material, the image processing apparatus 11 can also smoothen changes in grayscale which may cause an undesired striped pattern. In this case, the predetermined threshold value is experientially or experimentally determined on the basis of the image quality or the like as desired.

Then, the delayed signal delayed by the delay unit 102 is added to a quantized value input from an input terminal 83 by an addition unit 105, and the result is supplied to the switch 101. A difference between the delayed signal and the quantized value input from the input terminal 83 is determined by a subtraction unit 106, and is input to the switch 101. Accordingly, the signal of the current pixel input from the input terminal 81, the result of the addition of the delayed signal and the quantized value, which is obtained by the addition unit 105, and the result of the subtraction between the delayed signal and the quantized value, which is obtained by the subtraction unit 106, are supplied to the switch 101. The value obtained by the addition unit 105 as a result of the addition of the delayed signal and the quantized value is equal to a value obtained by adding a predetermined quantized value to a preceding pixel (an adjacent pixel), and the value obtained by the subtraction unit 106 as a result of the subtraction between the delayed signal and the quantized value is equal to a value obtained by subtracting a predetermined quantized value from a preceding pixel (an adjacent pixel).

The comparison processing unit 104 controls the switch 101 so that, for the first pixel on each horizontal line, the switch 101 outputs the signal of the current pixel supplied from the input terminal 81.

When the subtraction result obtained by the subtraction unit 103 is greater than the predetermined threshold value input from the input terminal 82 or when the subtraction result obtained by the subtraction unit 103 is equal to 0, that is, when a grayscale difference between an output value corresponding to the preceding pixel and the value of the current pixel supplied from the input terminal 81 is greater than the predetermined threshold value or when an output value corresponding to the preceding pixel and the value of the current pixel are the same in grayscale, the comparison processing unit 104 controls the switch 101 so that the switch 101 outputs the signal of the current pixel supplied from the input terminal 81.

When the subtraction result obtained by the subtraction unit 103 is less than or equal to the predetermined threshold value input from the input terminal 82 and when the delayed signal is smaller than the current pixel signal, that is, when a grayscale difference between an output value corresponding to the preceding pixel and the value of the current pixel supplied from the input terminal 81 is smaller than the predetermined threshold value and when the grayscale increases, the comparison processing unit 104 controls the switch 101 to output the calculation result obtained by the addition unit 105.

When the subtraction result obtained by the subtraction unit 103 is smaller than or equal to the predetermined threshold value input from the input terminal 82 and when the delayed signal is greater than the current pixel signal, that is, when a grayscale difference between an output value corresponding to the preceding pixel and the value of the current pixel supplied from the input terminal 81 is smaller than the predetermined threshold value and when the grayscale decreases, the comparison processing unit 104 controls the switch 101 to output the calculation result obtained by the subtraction unit 106.

That is, the X-direction primary low-pass filter 32 compares an input pixel value with a value output in correspondence with the preceding pixel, and directly outputs the input pixel value when the grayscale difference between the input pixel value and the value output as the value of the preceding pixel (adjacent pixel) is greater than or equal to a predetermined threshold value. When the input pixel value is greater than the value output as the value of the preceding pixel and when the difference therebetween is less than or equal to a predetermined threshold value, the X-direction primary low-pass filter 32 outputs a value obtained by adding a predetermined quantized value to the value output as the value of the preceding pixel. When the input pixel value is smaller than the value output as the value of the preceding pixel and the difference therebetween is less than or equal to the predetermined threshold value, the X-direction primary low-pass filter 32 outputs a value obtained by subtracting a predetermined quantized value from the value output as the value of the preceding pixel.

Figure 4:
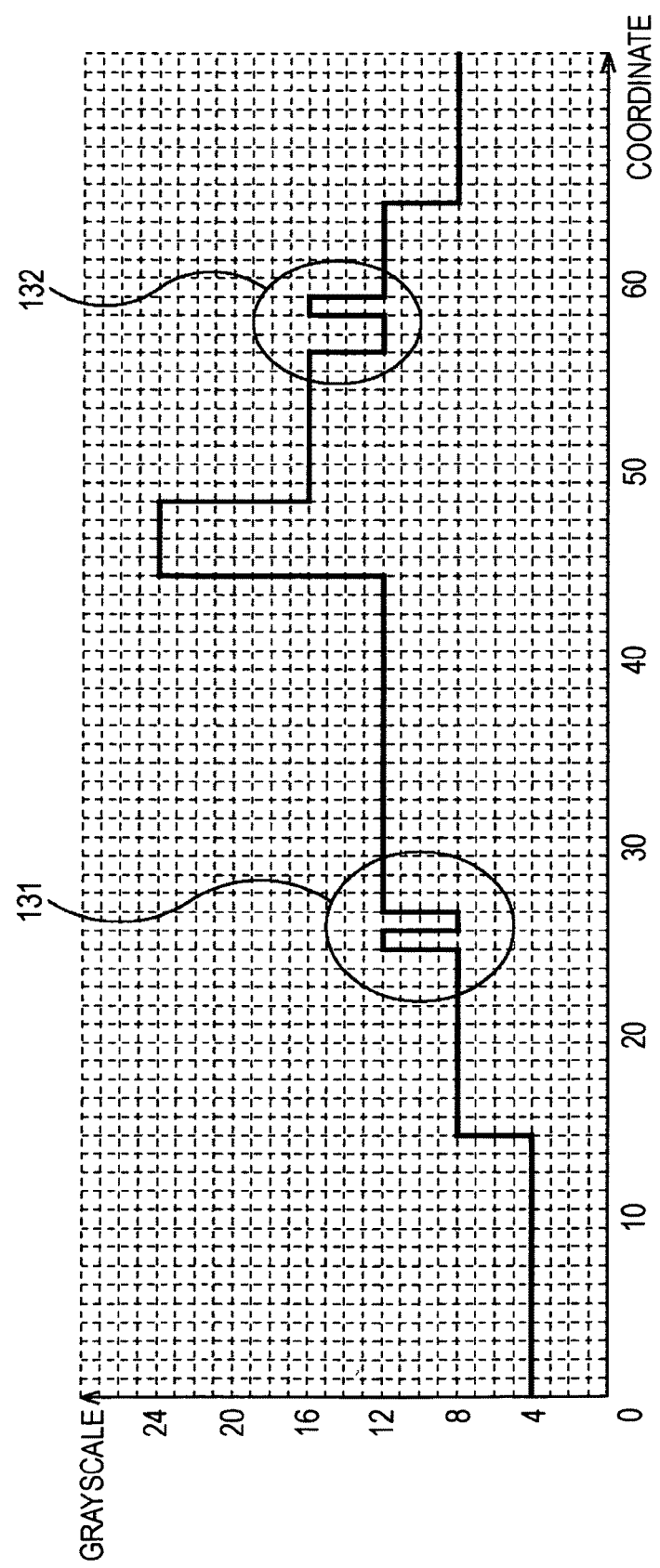
FIG. 4 is a diagram showing an input signal input to the X-direction primary low-pass filter.

For example, an input value for a certain horizontal line is equal to a value shown in FIG. 4. When the predetermined threshold value input from the input terminal 82 of the X-direction primary low-pass filter 32 is equal to 4 and when the quantized value supplied from the input terminal 83 is equal to 1, the X-direction primary low-pass filter 32 outputs a signal shown in FIG. 5.

That is, in the input signal, a grayscale change portion less than or equal to a threshold value of 4 gradually changes by steps of one grayscale level. In a grayscale change portion greater than or equal to the threshold value, on the other hand, the input signal is directly output and high-frequency components are stored. This prevents noise components 131 and 132 shown in FIG. 4 from being noticeable in the output signal shown in FIG. 5.

Accordingly, the X-direction primary low-pass filter 32 reduces changes in grayscale over one pixel to about several pixels, which are less than or equal to a threshold value, to remove noise components in the horizontal direction.

Figure 5:
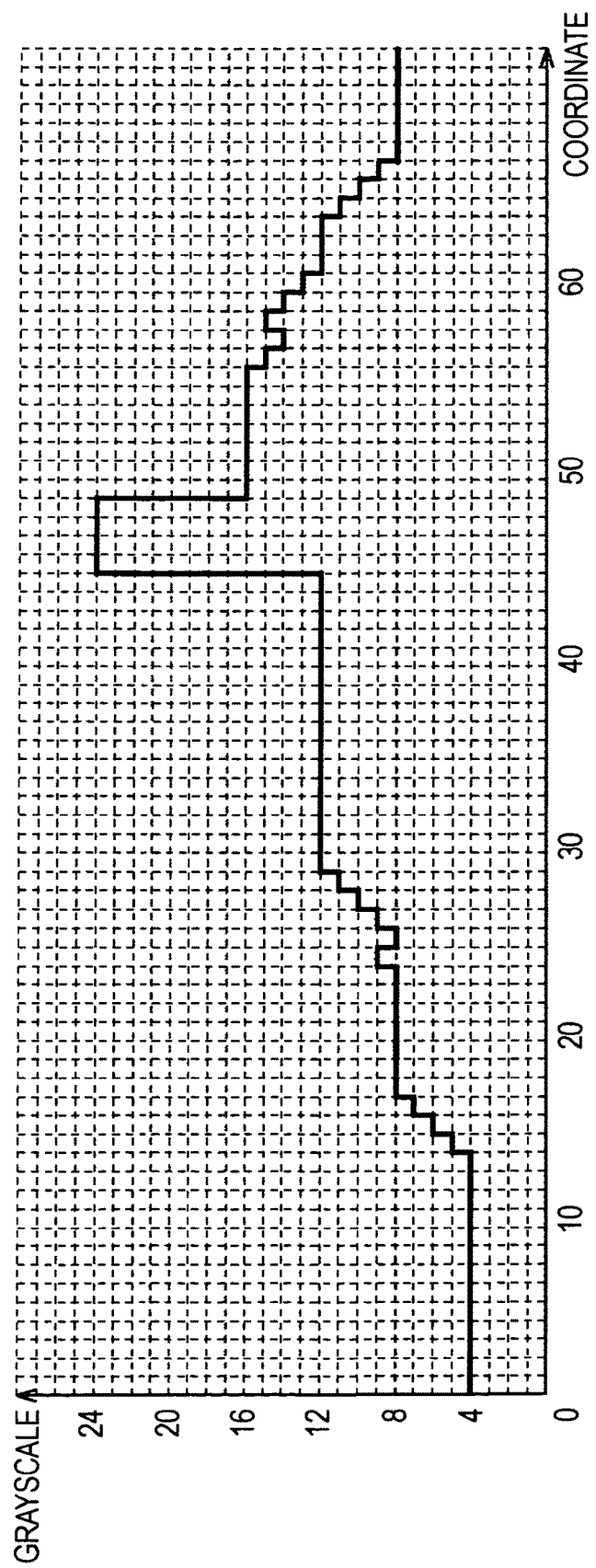
FIG. 5 is a diagram showing an output signal from the X-direction primary low-pass filter.

The input and output signals described with reference to FIGS. 4 and 5 are also obtained, for example, when the threshold value is equal to 1 and the quantized value is equal to ¼, wherein the bit width of the output signal is expanded by two bits.

Figure 6:
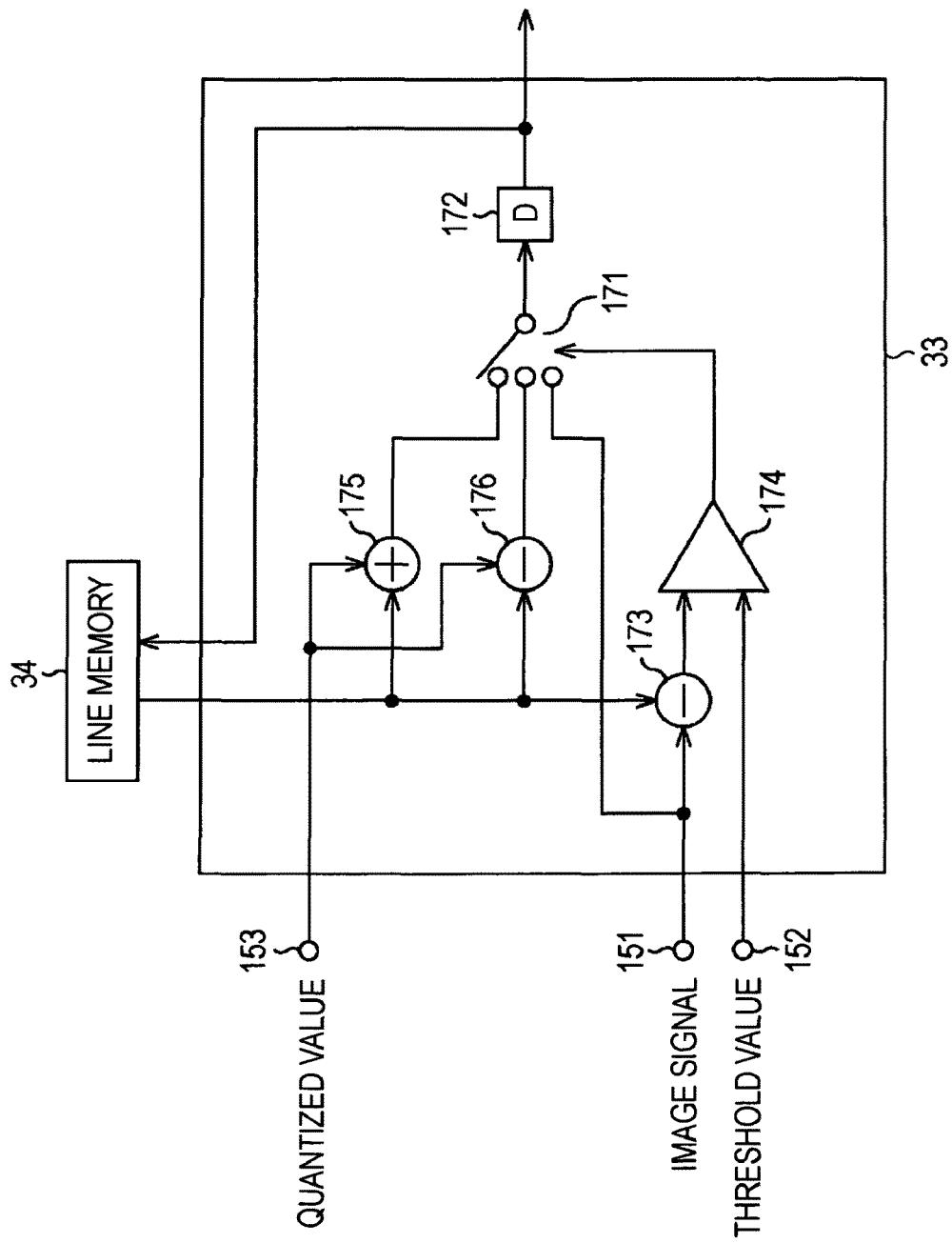
FIG. 6 is a block diagram showing a Y-direction primary low-pass filter shown in FIG. 1.

FIG. 6 is a diagram showing a structure of the Y-direction primary low-pass filter 33. The structure of the Y-direction primary low-pass filter 33 shown in FIG. 6 is different from that of the X-direction primary low-pass filter 32 shown in FIG. 3 in that the output of a delay unit 172 is supplied to the smooth-area detection processing unit 35 and is also supplied to the line memory 34 and in that, instead of the output of the delay unit 172, an output value corresponding to an upper pixel vertically adjacent to the current pixel, which is supplied to the line memory 34, is supplied to a subtraction unit 173, an addition unit 175, and a subtraction unit 176.

That is, the Y-direction primary low-pass filter 33 executes a data comparison and interpolation process in the vertical direction. In the Y-direction primary low-pass filter 33, it is also assumed that pixel signals are supplied in a horizontally sequentially scanned order (a raster scan order) from the upper left pixel of pixel data for one frame, and is processed.

The 10-bit digital pixel signal supplied from the X-direction primary low-pass filter 32 is supplied from an input terminal 151 to a switch 171 and is also supplied to the subtraction unit 173. The output of the switch 171 is determined according to a comparison result obtained by a comparison processing unit 174 (which will be described below). A delayed signal that is supplied from the switch 171 to the delay unit 172 and that is delayed is supplied to the smooth-area detection processing unit 35 and is also supplied to the line memory 34. The line memory 34 may be a line memory capable of storing delayed signals for one horizontal line.

The subtraction unit 173 calculates a difference between the signal of the current pixel supplied from the input terminal 151 and an output value corresponding to an upper pixel vertically adjacent to the current pixel, which is stored in the line memory 34, and supplies the subtraction result and a signal indicating which of the signal of the current pixel and the delayed signal is greater to the comparison processing unit 174. A predetermined threshold value input from an input terminal 152 is also supplied to the comparison processing unit 174. The predetermined threshold value is preferably a (bit difference)-th power of 2, which is similar to that of the X-direction primary low-pass filter 32 described above.

The output value corresponding to the upper pixel vertically adjacent to the current pixel, which is stored in the line memory 34, is added to the quantized value input from an input terminal 153 by the addition unit 175, and the result is supplied to the switch 171. A difference between the output value and the quantized value input from the input terminal 153 is calculated by the subtraction unit 176, and is input to the switch 171. Accordingly, the current pixel signal input from the input terminal 151, the result of the addition of the output value corresponding to the upper pixel vertically adjacent to the current pixel and the quantized value, which is obtained by the addition unit 175, and the result of the subtraction between the output value corresponding to the upper pixel vertically adjacent to the current pixel and the quantized value, which is obtained by the subtraction unit 176, are supplied to the switch 171. The value obtained by the addition unit 175 as a result of the addition of the delayed signal and the quantized value is equal to a value obtained by adding a predetermined quantized value to the output value corresponding to the upper pixel vertically adjacent to the current pixel, and the value obtained by the subtraction unit 176 as a result of the subtraction between the delayed signal and the quantized value is equal to a value obtained by subtracting a predetermined quantized value from the output value corresponding to the upper pixel vertically adjacent to the current pixel.

The comparison processing unit 174 controls the switch 171 so that, for pixels of the first horizontal line, the switch 171 outputs the signal of the current pixel supplied from the input terminal 151.

When the subtraction result obtained by the subtraction unit 173 is greater than the predetermined threshold value input from the input terminal 152 or when the subtraction result obtained by the subtraction unit 173 is equal to 0, that is, when a grayscale difference between the output value corresponding to the upper pixel vertically adjacent to the current pixel and the value of the current pixel supplied from the input terminal 151 is greater than the predetermined threshold value or when the output value corresponding to the upper pixel vertically adjacent to the current pixel and the value of the current pixel are the same in grayscale, the comparison processing unit 174 controls the switch 171 so that the switch 171 outputs the signal of the current pixel supplied from the input terminal 151.

When the subtraction result obtained by the subtraction unit 173 is less than or equal to the predetermined threshold value input from the input terminal 152 and when the delayed signal is smaller than the current pixel signal, that is, when a grayscale difference between the output value corresponding to the upper pixel vertically adjacent to the current pixel and the current pixel supplied from the input terminal 151 is smaller than the predetermined threshold value and when the grayscale increases, the comparison processing unit 174 controls the switch 171 to output the calculation result obtained by the addition unit 175.

When the subtraction result obtained by the subtraction unit 173 is less than or equal to the predetermined threshold value input from the input terminal 152 and when the delayed signal is greater than the current pixel signal, that is, when a grayscale difference between the output value corresponding to the upper pixel vertically adjacent to the current pixel and the value of the current pixel supplied from the input terminal 151 is smaller than the predetermined threshold value and when the grayscale decreases, the comparison processing unit 174 controls the switch 171 to output the calculation result obtained by the subtraction unit 176.

That is, the Y-direction primary low-pass filter 33 compares an input pixel value with a value output in correspondence with an upper pixel vertically adjacent to the current pixel, and directly outputs the input pixel when the grayscale difference between the input pixel value and the value output in correspondence with the upper pixel vertically adjacent to the current pixel is greater than or equal to a predetermined threshold value. When the input pixel value is greater than the value output as the value of the upper pixel vertically adjacent to the current pixel and when the difference therebetween is less than or equal to a predetermined threshold value, the Y-direction primary low-pass filter 33 outputs a value obtained by adding a predetermined quantized value to the value output as the upper pixel vertically adjacent to the current pixel. When the input pixel value is smaller than the value output as the upper pixel vertically adjacent to the current pixel and when the difference therebetween is less than or equal to the predetermined threshold value, the Y-direction primary low-pass filter 33 outputs a value obtained by subtracting a predetermined quantized value from the value output as the value of the upper pixel vertically adjacent to the current pixel.

A result of the processing performed by the Y-direction primary low-pass filter 33 is similar to that of the X-direction primary low-pass filter 32 although the directions are different.

For example, an input value for a certain vertical line is equal to the value shown in FIG. 4. When the predetermined threshold value input from the input terminal 152 of the Y-direction primary low-pass filter 33 is equal to 4 and when the quantized value supplied from the input terminal 153 is equal to 1, a signal output from the Y-direction primary low-pass filter 33 for the same vertical is as shown in FIG. 5.

That is, in an input signal for a certain vertical line, a grayscale change portion less than or equal to a threshold value of 4 gradually changes by steps of one grayscale level. In a grayscale change portion greater than or equal to the threshold value, on the other hand, the input signal is directly output and high-frequency components are stored. This prevents noise components 131 and 132 shown in FIG. 4 from being noticeable in the output signal shown in FIG. 5.

Accordingly, the Y-direction primary low-pass filter 33 reduces changes in grayscale over one pixel to about several pixels, which are less than or equal to a threshold value, to remove noise components in the vertical direction.

The input and output signals described with reference to FIGS. 4 and 5 are also obtained in the vertical direction, for example, when the threshold value is equal to 1 and the quantized value is equal to ¼, wherein the bit width of the output signal is expanded by two bits.

A first example of the operation of the smooth-area detection processing unit 35 will now be described with reference to FIG. 7.

Also in the smooth-area detection processing unit 35, binary calculation is executed. Thus, a threshold value TH used for the detection of a smooth area is preferably a power of 2. The threshold value TH may be different from the threshold value used for the noise removal process described above; however, the threshold value TH, which is used for the determination of whether or not smoothing is actually necessary, is preferably substantially the same as the threshold value used for the noise removal process described above, that is, a (bit difference)-th power of 2. It is assumed here that the threshold value TH is equal to 4 and a quantized value QB is equal to 1.

The smooth-area detection processing unit 35 determines a value Y1 by dividing a value obtained by adding one-half (½) the threshold value TH to the input signal by the threshold value TH. FIG. 7 shows the value Y1 obtained when the image signal shown in FIG. 5 is input. The addition of ½ the threshold value TH to the input signal is carried out in order to prevent a deviation between a grayscale change point of the signal Y1 output from the smooth-area detection processing unit 35 and a change point of the original input signal before passing though the X-direction primary low-pass filter 32 and the Y-direction primary low-pass filter 33. The description is made in the context of the addition of the value Y1 determined by dividing the value obtained by adding ½ the threshold value TH to the input signal by the threshold value TH, by way of example. Alternatively, a value obtained by adding substantially ½ the threshold value TH, instead of ½ the threshold value TH, may be used.

Figure 7:
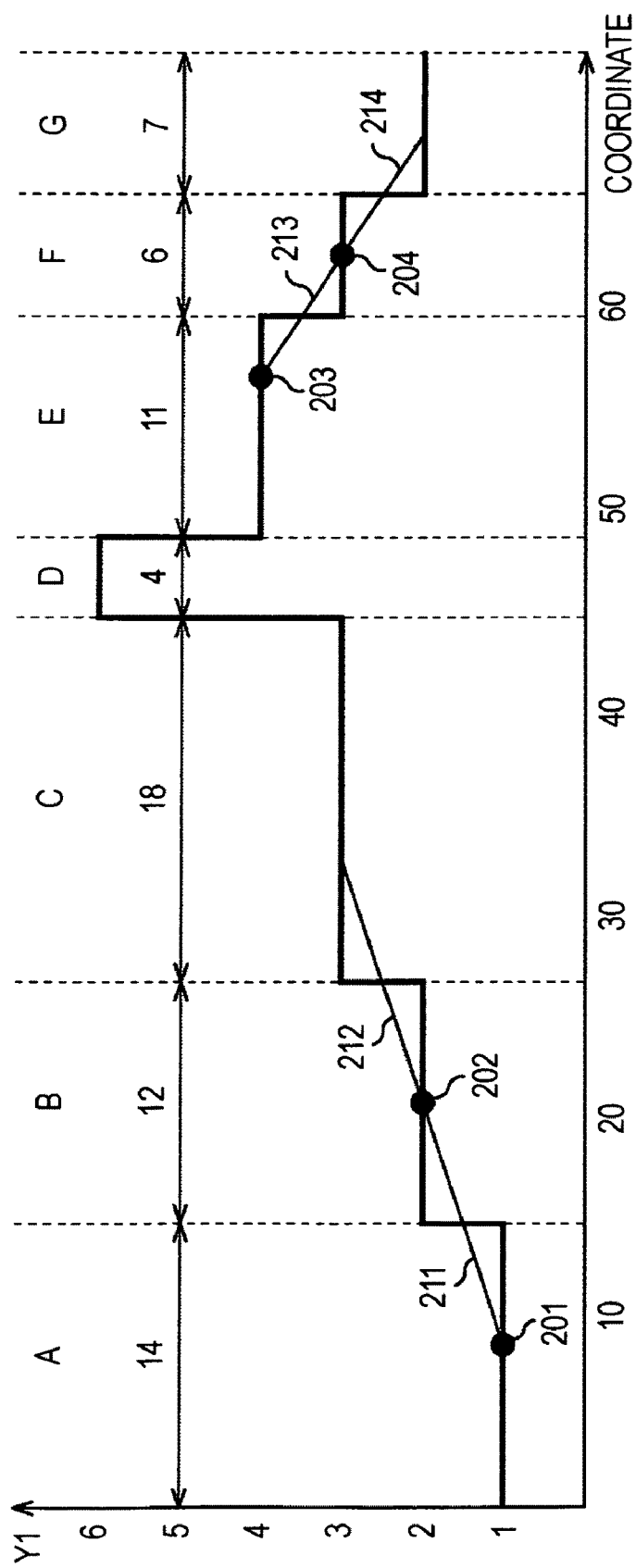
FIG. 7 is a diagram showing an example of the operation of a smooth-area detection processing unit shown in FIG. 1.

In FIG. 7, the value Y1 is kept the same for each of regions A to G. When the amount of change of an input signal Y is less than or equal to the threshold value TH, in other words, when the amount of change in the value Y1 is less than or equal to 1, the smooth-area detection processing unit 35 detects an interpolation process starting point and an interpolation process gradient for executing an interpolation process of a smooth area to smoothen changes before and after the corresponding change portion.

Since the region B is shorter than the region A, the smooth-area detection processing unit 35 determines an interpolation process starting point in the region A by subtracting ½ the number of pixels in the region B from a change point between the regions A and B, in other words, by determining a point 201, which is earlier in time than the change point in the scan order by ½ the number of pixels in the region B. That is, the smooth-area detection processing unit 35 sets a coordinate value given by 14−(12/2)=8 on the line associated with the region A as the first interpolation process starting point, and records the coordinate value in a sequence SS. The point obtained by subtracting ½ the number of pixels in the region B from the change point between the regions A and B is set as an interpolation process starting point. Alternatively, a point obtained by subtracting substantially ½ the number of pixels in the region B from the change point between the regions A and B may be used as an interpolation process starting point.

The smooth-area detection processing unit 35 further determines a gradient from the first interpolation process starting point by dividing the number of pixels in the region B, which is shorter in the two adjacent regions, by a value given by dividing the threshold value TH by the quantized value QB (in this example, 4/1=4) (i.e., in this example, 12/4=3). The polarity of the gradient is positive when the input signal increases before and after the change point and is negative when it decreases. In this example, therefore, the polarity of the gradient is positive. The smooth-area detection processing unit 35 records the obtained first interpolation process gradient in a sequence SD.

In FIG. 7, the straight line on which the determined first interpolation process starting point and gradient are based is shown as a straight line 211.

Since the region B is shorter than the region C, the smooth-area detection processing unit 35 determines an interpolation process starting point in the region B by subtracting ½ (or substantially ½) the number of pixels in the region B (or the width of the region B) from a change point between the regions B and C to determine a point 202. That is, the smooth-area detection processing unit 35 sets a coordinate value of 20 on the line associated with the region B as the second interpolation process starting point, and records the coordinate value in the sequence SS. The smooth-area detection processing unit 35 further determines a gradient from the second interpolation process starting point by dividing the number of pixels in the region B, which is shorter in the two adjacent regions, by a value given by dividing the threshold value TH by the quantized value QB (i.e., in this example, 12/4=3), and records the obtained second interpolation process gradient (which is also positive polarity) in the sequence SD. In FIG. 7, the straight line on which the determined second interpolation process starting point and gradient are based is shown as a straight line 212.

Since the amount of change in grayscale between the regions C and D and between the region D and E is greater than the threshold value TH, no interpolation is executed. In the regions E and F, an interpolation process similar to that described above is performed to record points 203 and 204 shown in FIG. 7 in the sequence SS and to record the gradients (both of which are equal to −1.5) of straight lines 213 and 214 shown in FIG. 7 in the sequence SD.

A second example of the operation of the smooth-area detection processing unit 35 will now be described with reference to FIG. 8.

Also in the second example, binary calculation is executed. Thus, a threshold value TH used for the detection of a smooth area is preferably a power of 2, and more preferably a (bit difference)-th power of 2. The threshold value TH may be different from the threshold value used for the noise removal process described above; however, the threshold value TH, which is used for the determination of whether or not smoothing is actually necessary, is preferably substantially the same as the threshold value used for the noise removal process described above. It is also assumed here that the threshold value TH is equal to 4 and the quantized value QB is equal to 1.

Also in the second example, the smooth-area detection processing unit 35 determines a value Y1 by dividing a value obtained by adding ½ (or substantially ½) the threshold value TH to the input signal by the threshold value TH. FIG. 8 shows the value Y1 obtained when the image signal shown in FIG. 5 is input. The addition of ½ (or substantially ½) the threshold value TH to the input signal is carried out in order to prevent a deviation between a grayscale change point of the signal Y1 output from the smooth-area detection processing unit 35 and a change point of the original input signal before passing through the X-direction primary low-pass filter 32 and the Y-direction primary low-pass filter 33.

Figure 8:
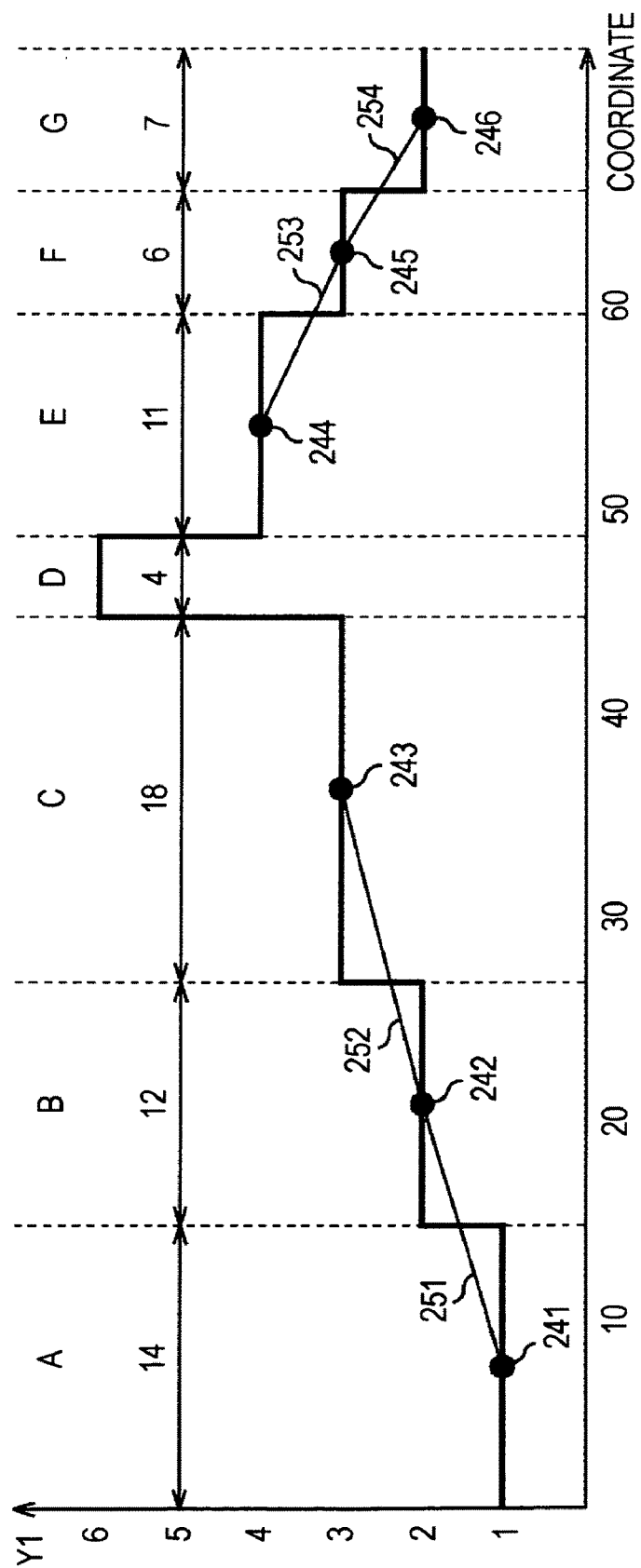
FIG. 8 is a diagram showing another example of the operation of the smooth-area detection processing unit shown in FIG. 1.

Also in FIG. 8, the value Y1 is kept the same for each of regions A to G. When the amount of change of an input signal Y is less than or equal to the threshold value TH, in other words, when the amount of change in the value Y1 is less than or equal to 1, the smooth-area detection processing unit 35 detects an interpolation process starting point and an interpolation process gradient for executing an interpolation process of a smooth area to smoothen changes before and after the corresponding change portion.

When an interpolation process is to be executed in the regions A and B, the smooth-area detection processing unit 35 determines an interpolation process starting point in the region A by subtracting ½ (or substantially ½) the number of pixels in the region A (or the width of the region A) from a change point between the regions A and B to determine a point 241. That is, the smooth-area detection processing unit 35 sets a coordinate value of 7 as the interpolation process starting point, and records the coordinate value in a sequence Ss. The smooth-area detection processing unit 35 further determines a gradient from the first interpolation process starting point by dividing ½ (or substantially ½) a sum of the number of pixels in the region A and the number of pixels in the region B (or a sum of the width of the region A and the width of the region B) by a value given by dividing the threshold value TH by the quantized value QB (in this example, 4/1=4). The polarity of the gradient is positive when the input signal increases before and after the change point and is negative when it decreases. The gradient from the first interpolation process starting point is given by (14+12)/(2× 4)=3.25, and is positive in polarity. Thus, the value of +3.25 is recorded in a sequence SD configured to record an interpolation process gradient.

In FIG. 8, the straight line on which the determined first interpolation process starting point and gradient are based is shown as a straight line 251.

Likewise, the smooth-area detection processing unit 35 further determines an interpolation process starting point in the region B by subtracting ½ (or substantially ½) the number of pixels in the region B (or the width of the region B) from a change point between the regions B and C to determine a point 242. That is, the smooth-area detection processing unit 35 sets a coordinate value of 20 as the second interpolation process starting point, and records the coordinate value in the sequence SS. The smooth-area detection processing unit 35 further determines the second interpolation process gradient in a manner similar to that described above by dividing ½ (or substantially ½) a sum of the number of pixels in the region B and the number of pixels in the region C (or a sum of the width of the region B and the width of the region C) by a value given by dividing the threshold value TH by the quantized value QB (in this example, 4/1=4), and records a positive value given by (12+18)/(2×4)=3.75 in the sequence SD as the interpolation process gradient. In FIG. 8, the straight line on which the determined second interpolation process starting point and gradient are based is shown as a straight line 252.

Since the amount of change in grayscale between the regions C and D and between the regions D and E is greater than the threshold value TH, no interpolation is executed. In the regions E and F, an interpolation process similar to that described above is performed to record points 244 and 245 shown in FIG. 8 in the sequence SS and to record the gradients (which are equal to $^{17}\!/_{8}$ and $^{13}\!/_{8}$, respectively) of straight lines 253 and 254 shown in FIG. 8 in the sequence SD.

In either the first or second example of the operation of the smooth-area detection processing unit 35 described above, the sequences SS and SD are alternately supplied to the first data memory unit 51 and the second data memory unit 52 on a line-by-line basis for recording.

The operation of the smoothing processing unit 40 will now be described with reference to FIGS. 9 and 10.

Figure 9:
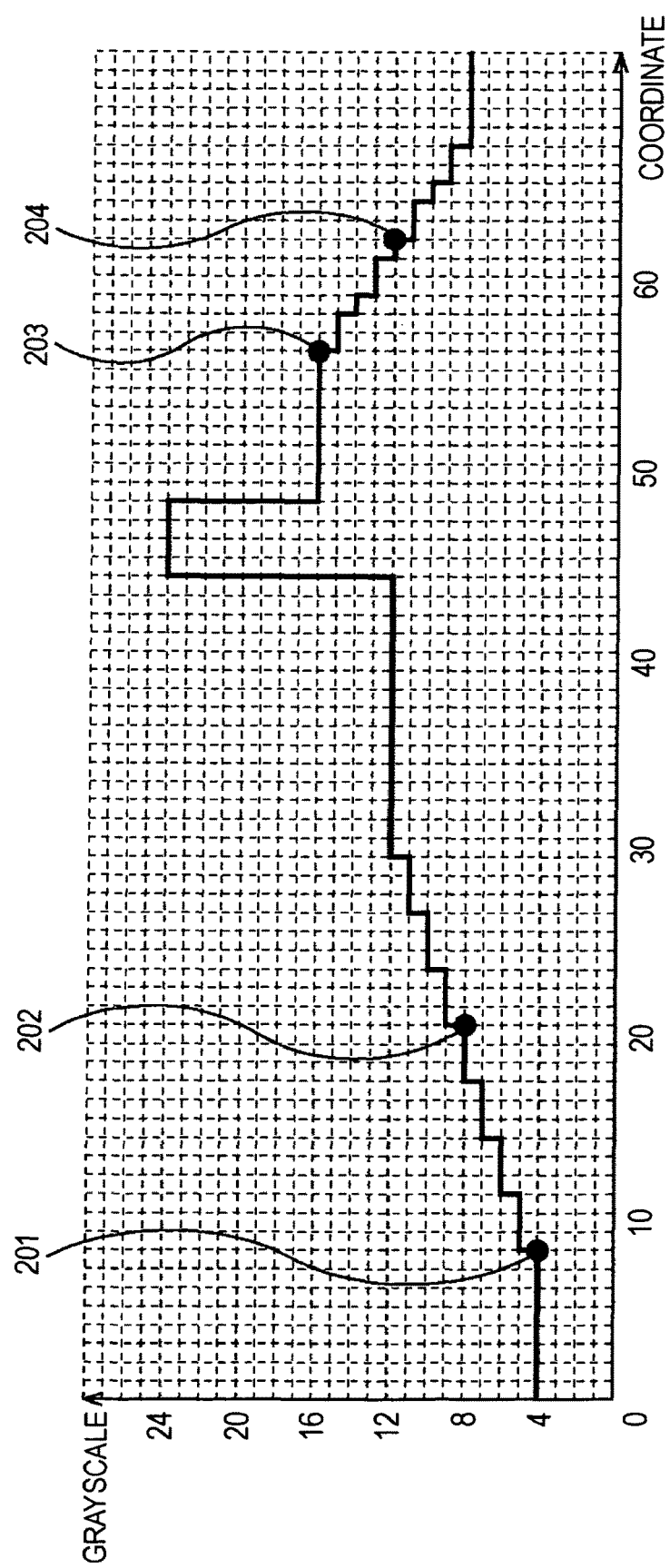
FIG. 9 is a diagram showing an example of the operation of a smoothing processing unit shown in FIG. 1.
Figure 10:
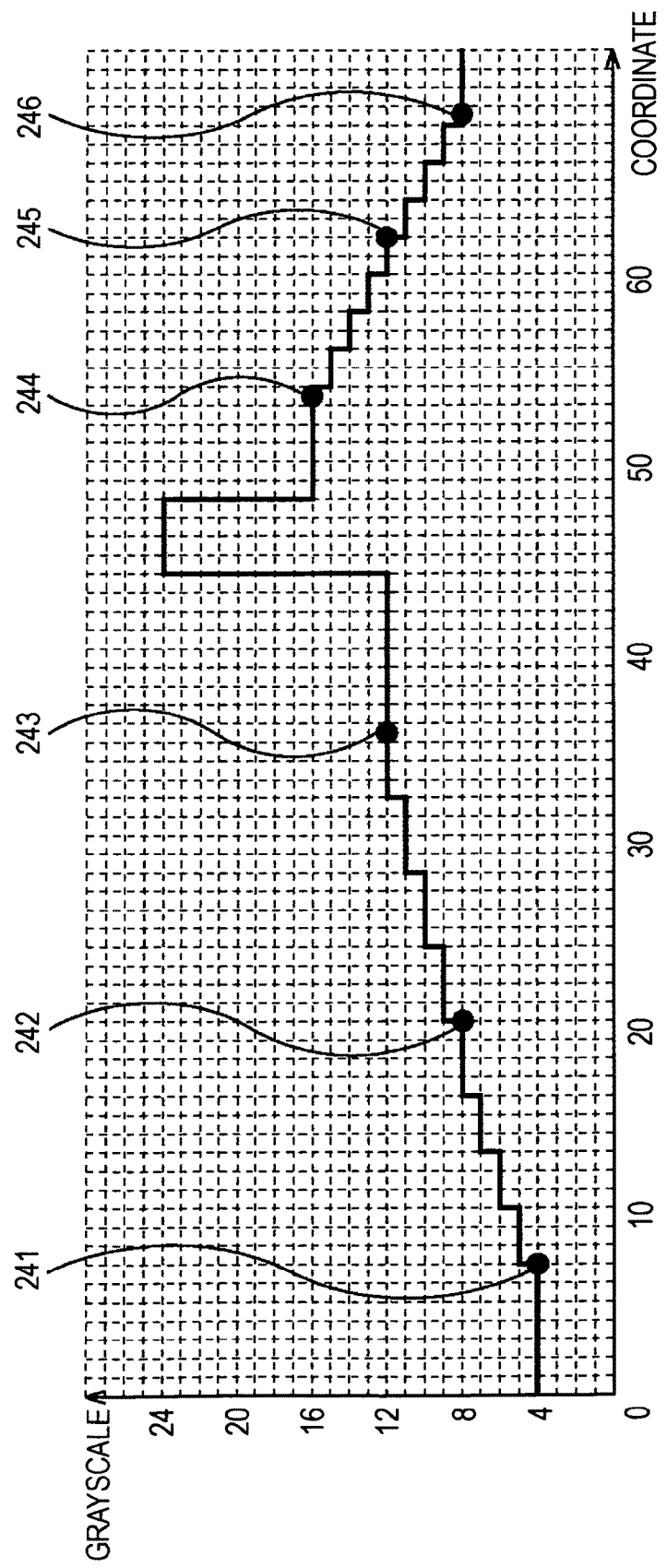
FIG. 10 is a diagram showing another example of the operation of the smoothing processing unit shown in FIG. 1.

FIGS. 9 and 10 show an output signal processed by the smoothing processing unit 40. FIG. 9 shows an output signal obtained by the smoothing processing unit 40 when the first example of the operation of the smooth-area detection processing unit 35 shown in FIG. 7 is executed, and FIG. 10 shows an output signal obtained by the smoothing processing unit 40 when the second example of the operation of the smooth-area detection processing unit 35 shown in FIG. 8 is executed.

The smoothing processing unit 40 performs grayscale interpolation on the output signal Y1 supplied from the line memory 36 on the basis of the interpolation process starting point recorded in the sequence SS described above and the gradient of the straight line on which the interpolation process is based, which is recorded in the sequence SD described above.

In FIG. 9, grayscale values are reconstructed so that the grayscale gradually changes with the gradient of the straight line on which the interpolation process is based, which is recorded in the sequence SD, from the points 201 and 204 at the coordinate values recorded in the sequence SS, and, for the remaining portion, the input image is directly output. Also In FIG. 10, grayscale values are reconstructed so that the grayscale gradually changes with the gradient of the straight line on which the interpolation process is based, which is recorded in the sequence SD, from the points 241, 242, 244, and 245 at the coordinate values recorded in the sequence SS, and, for the remaining portion, the input image is directly output. Therefore, the quantization of the grayscale values is refined only in an area where the grayscale gradually changes with a desired threshold value or less without impairing the high-frequency components of the image, thus obscuring stepped edges of grayscale, which are noticeable due to the insufficient quantization of the input image.

Accordingly, the image processing apparatus 11 can prevent the occurrence of an undesired striped pattern without causing defects such as flicker regardless of the distance between grayscale change points.

Figure 11:
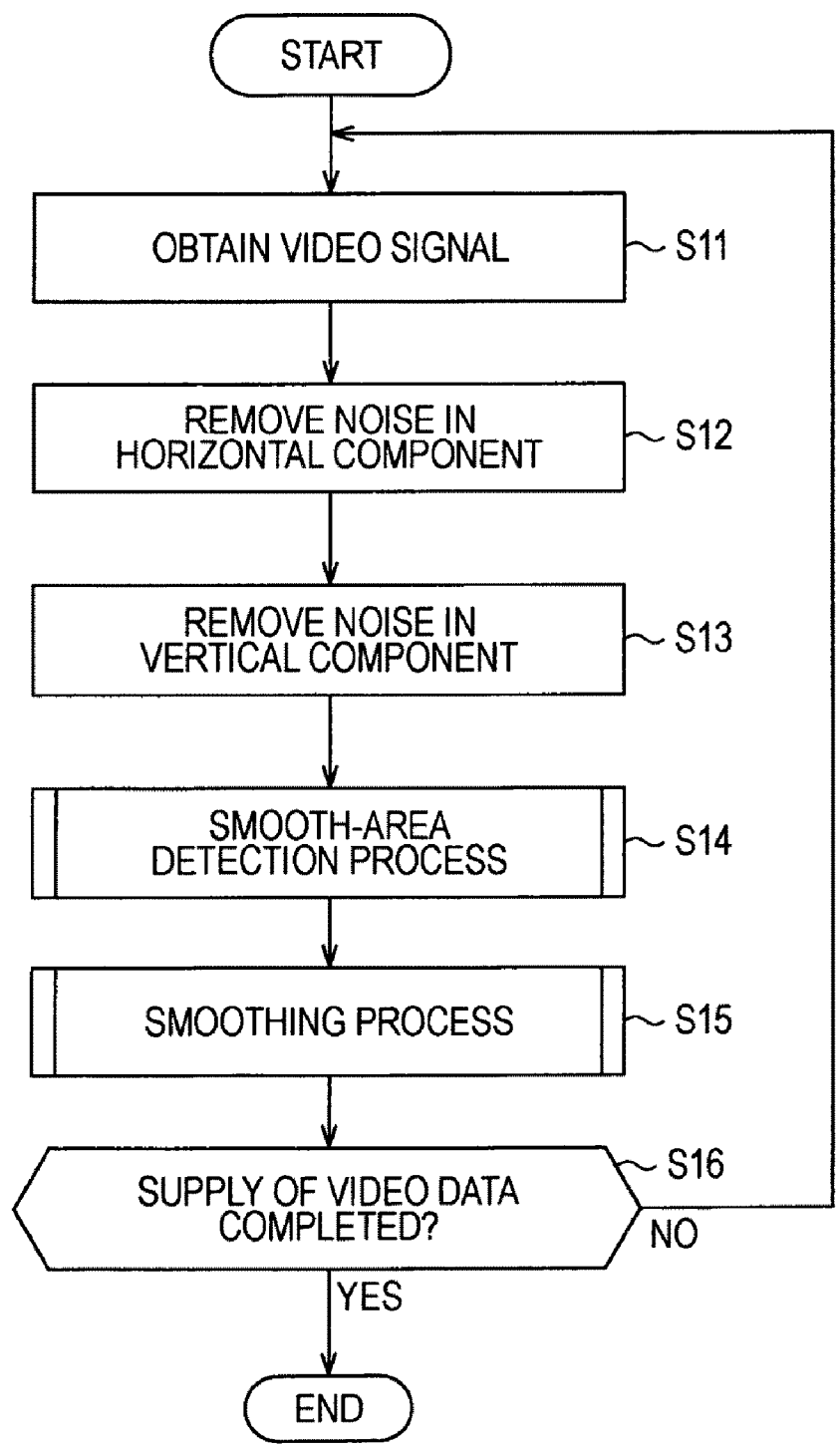
FIG. 11 is a flowchart showing an image conversion process.

Next, an image conversion process executed by the image processing apparatus 11 will be described with reference to a flowchart shown in FIG. 11.

In step S11, the video data obtaining unit 31 obtains video data and outputs a 10-bit digital video signal to the X-direction primary low-pass filter 32.

In step S12, the X-direction primary low-pass filter 32 removes noise in the horizontal components, for example, in the manner described above with reference to FIG. 3.

In step S13, the Y-direction primary low-pass filter 33 removes noise in the vertical components, for example, in the manner described above with reference to FIG. 6.

Figure 12:
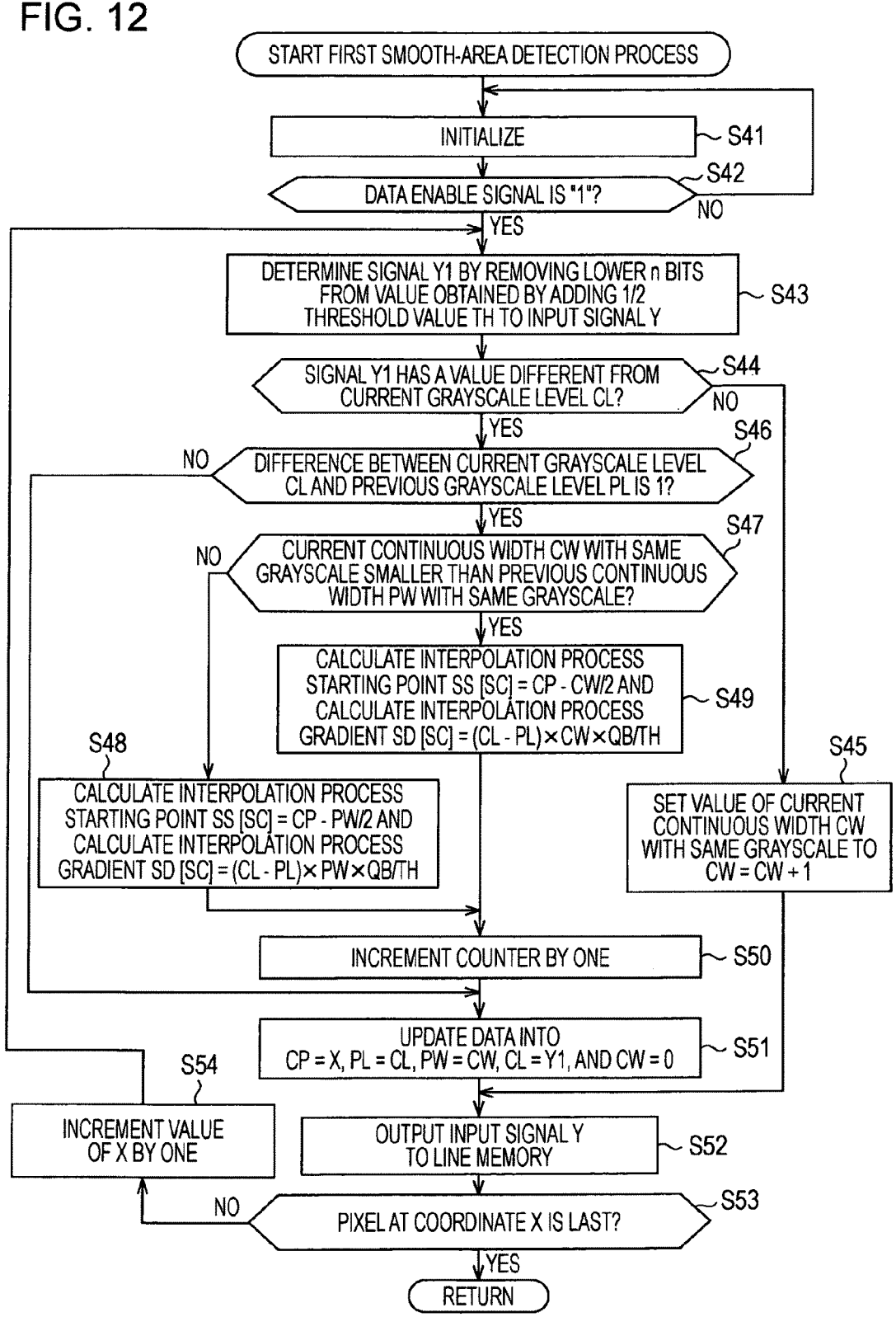
FIG. 12 is a flowchart showing a first smooth-area detection process.
Figure 13:
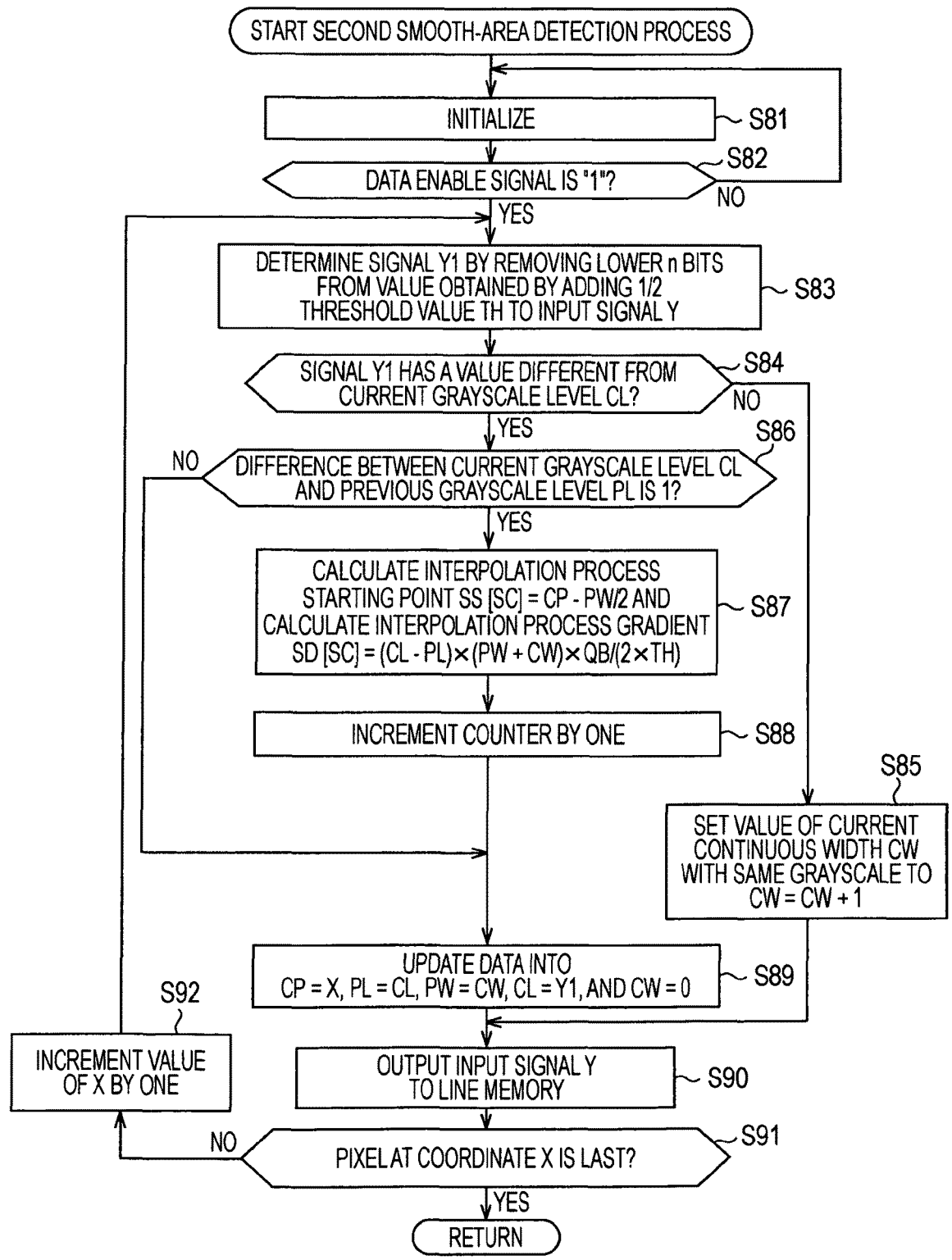
FIG. 13 is a flowchart showing a second smooth-area detection process.

In step S14, a smooth-area detection process, which will be described below with reference to FIG. 12 or 13, is executed.

Figure 14:
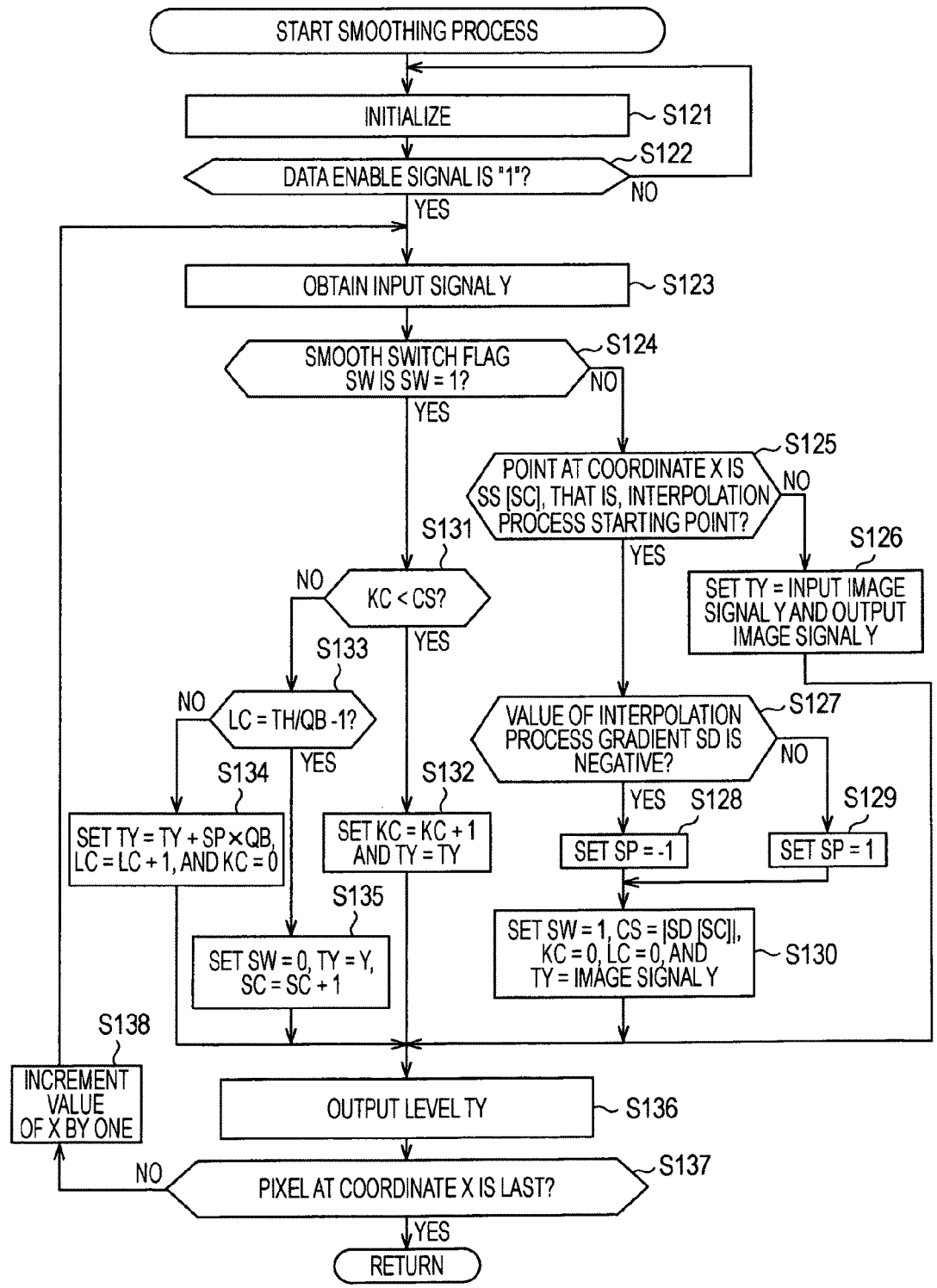
FIG. 14 is a flowchart showing a smoothing process.

In step S15, a smoothing process, which will be described below with reference to FIG. 14, is executed.

In step S16, it is determined whether or not the supply of video data has been completed. If it is determined that the supply of video data has not been completed, the process returns to step S11, and the subsequent processing is repeated. If it is determined that the supply of video data has been completed, the process ends.

With the process described above, the image processing apparatus 11 can prevent the occurrence of an undesired striped pattern without causing defects such as flicker even in a case where a distance between grayscale change points is significantly large.

A first smooth-area detection process, which is a first example of the process executed in step S14 shown in FIG. 11, will now be described with reference to a flowchart shown in FIG. 12.

In step S41, the smooth-area detection processing unit 35 initializes parameters. That is, the smooth-area detection processing unit 35 initializes individual variables in a blanking period during which no data is input.

In step S42, the smooth-area detection processing unit 35 determines whether or not a data enable signal is "1", that is, whether or not there is a data input. If it is determined in step S42 that the data enable signal is not "1", the process returns to step S41, and the subsequent processing is repeated.

If it is determined in step S42 that the data enable signal is "1", in step S43, the smooth-area detection processing unit 35 determines a signal Y1 by removing lower n bits from a value obtained by adding ½ (or substantially ½) the threshold value TH to the input signal Y.

Since binary calculation is executed also in the smooth-area detection processing unit 35, the threshold value TH used for the detection of a smooth area is preferably a power of 2. The threshold value TH may be different from the threshold value used for the noise removable process described above; however, the threshold value TH, which is used for the determination of whether or not smoothing is actually necessary, is preferably substantially the same as the threshold value used for the noise removal process described above, that is, a (bit difference)-th power of 2. It is assumed here that the threshold value TH is equal to 4.

The addition of ½ (or substantially ½) the threshold value TH to the input signal to determine the signal Y1 is carried out in order to prevent a deviation between a grayscale change point of the signal Y1 output from the smooth-area detection processing unit 35 and a change point of the original input signal before passing through the X-direction primary low-pass filter 32 and the Y-direction primary low-pass filter 33. With this process, the output signal Y1 is set to a signal with a minimum unit of the threshold value TH.

In step S44, the smooth-area detection processing unit 35 determines whether or not the signal Y1 has a value different from a current grayscale level CL (that is, a signal Y1 corresponding to the preceding pixel).

If it is determined in step S44 that the signal Y1 has the same value as the current grayscale level CL, in step S45, the smooth-area detection processing unit 35 sets the value of a current continuous width CW with the same grayscale (the number of pixels having the same grayscale value) to the value given by CW+1 (i.e., CW=CW+1), and the process proceeds to step S52 described below. The current continuous width CW with the same grayscale is used to finally determine the widths of, for example, the regions A to G described above with reference to FIG. 7.

If it is determined in step S44 that the signal Y1 does not have the same value as the current grayscale level CL, in step S46, the smooth-area detection processing unit 35 determines whether or not the difference between the current grayscale level CL and the previous grayscale level PL is 1. For example, in the example described with reference to FIG. 7, when the pixel currently being processed is within the region B, the current grayscale level CL is 2, and the previous grayscale level PL, which indicates the grayscale within the region A, is 1. The difference therebetween is 1. When the pixel currently being processed is within the region D, on the other hand, the current grayscale level CL is 6, and the previous grayscale level PL, which indicates the grayscale with the region C, is 3. The difference therebetween is 3.

If it is determined in step S46 that the difference between the current grayscale level CL and the previous grayscale level PL is not 1, this means no gradual changes. Then, the process proceeds to step S51.

If it is determined in step S46 that the difference between the current grayscale level CL and the previous grayscale level PL is 1, in step S47, the smooth-area detection processing unit 35 determines whether or not the current continuous width CW with the same grayscale is smaller than the previous continuous width PW with the same grayscale. For example, in the example described with reference to FIG. 7, when the pixel currently being processed is within the region B, the current continuous width CW with the same grayscale is 12, and the previous continuous width PW with the same grayscale, which indicates the grayscale within the region A, is 14.

If it is determined in step S47 that the current continuous width CW with the same grayscale is not smaller than the previous continuous width PW with the same grayscale, in step S48, the smooth-area detection processing unit 35 calculates an interpolation process starting point $SS[SC]=CP-PW/2$, where CP denotes the coordinate of a grayscale change point and QB denotes the quantized value (for example, in the example shown in FIG. 7, the quantized value QB is set to 1 (QB=1)), and calculates an interpolation process gradient $SD[SC]=(CL-PL) \times PW \times QB/TH$, where [SC] denotes the value of a counter indicating which interpolation process, as counted from the first one.

Then, the smooth-area detection processing unit 35 writes the interpolation process starting point SS[SC] and the interpolation process gradient SD[SC] to the data memory 38. Specifically, a value determined by subtracting ½ (or substantially ½) the previous continuous width PW from the change point CP is stored in the interpolation process starting point SS[SC], and a value determined by assigning a polarity, which is determined by the magnitude relationship between the current grayscale level CL and the previous grayscale level PL, to a value determined by dividing the previous continuous width PW by the value TH/QB is stored in the interpolation process gradient SD[SC], where the value TH/QB is given by dividing the threshold value TH by the quantized value QB, that is, the value TH/QB is used to determine the number of parts into which the change corresponding to the threshold value TH is to be divided. The range over which interpolation is performed is a range centered on the change point CP and starting from a point determined by subtracting ½ (or substantially ½) the previous continuous width PW from the change point CP to a point determined by adding ½ (or substantially ½) the previous continuous width PW to the change point CP.

If it is determined in step S47 that the current continuous width CW with the same grayscale is smaller than the previous continuous width PW with the same grayscale, in step S49, the smooth-area detection processing unit 35 calculates an interpolation process starting point $SS[SC]=CP-CW/2$, where CP denotes the coordinate of a grayscale change point and QB denotes the quantized value (for example, in the example shown in FIG. 7, the quantized value QB is set to 1 (QB=1)), and calculates an interpolation process gradient $SD[SC]=(CL-PL) \times CW \times QB/TH$, where [SC] denotes the value of a counter indicating which interpolation process, as counted from the first one.

Then, the smooth-area detection processing unit 35 writes the interpolation process starting point SS[SC] and the interpolation process gradient SD[SC] to the data memory 38.

Specifically, the processing of step S49 is performed by replacing the previous continuous width PW in the processing of step S48 with the current continuous width CW, and the range over which interpolation is performed is a range centered on the change point CP and starting from a point determined by subtracting ½ (or substantially ½) the current continuous width CW from the change point CP to a point determined by adding ½ (or substantially ½) the current continuous width CW to the change point CP.

After the processing of step S48 or S49 has been completed, in step S50, the smooth-area detection processing unit 35 increments the value [SC] of the counter indicating which interpolation process, as counted from the first one, by one.

If it is determined in step S46 that the difference between the current grayscale level CL and the previous grayscale level PL is not 1, or after the processing of step S50 has been completed, in step S51, the smooth-area detection processing unit 35 updates the data into CP=X, PL=CL, PW=CW, CL=Y1, and CW=0, where X denotes the value indicating the current coordinate. That is, the change point CP is updated to a point at the current coordinate according to CP=X; the current values CL and CW are changed to the previous values according to PL=CL and PW=CW; the signal Y1 is substituted into the current grayscale level CL, and the current continuous width CW with the same grayscale is reset to 0.

After the processing of step S45 or S51 has been completed, in step S52, the smooth-area detection processing unit 35 outputs the input signal Y to the line memory 36.

In step S53, the smooth-area detection processing unit 35 determines whether or not a pixel at the coordinate X is the last pixel on the current horizontal line.

If it is determined in step S53 that the pixel at the coordinate X is not the last pixel on the current horizontal line, in step S54, the smooth-area detection processing unit 35 increments the value of the coordinate X by one. Then, the process returns to step S43, and the subsequent processing is repeated. If it is determined in step S53 that the pixel at the coordinate X is the last pixel on the current horizontal line, the process ends.

With the process described above, an interpolation process starting point and interpolation gradient for executing an interpolation process are detected in the manner described with reference to FIG. 7.

A second smooth-area detection process, which is a second example of the process executed in step S14 shown in FIG. 11, will now be described with reference to a flowchart shown in FIG. 13.

In steps S81 to S86, processing similar to that of steps S41 to S46 shown in FIG. 12 is executed.

Specifically, after the initialization of parameters is executed, if the data enable signal is "1", a signal Y1 is calculated by removing lower n bits from a value obtained by adding ½ (or substantially ½) the threshold value TH to the input signal Y. If it is determined that the signal Y1 has the same value as the current grayscale level CL (that is, the signal Y1 corresponding to the preceding pixel), the value of the current continuous width CW with the same grayscale is set to the value given by CW+1 (i.e., CW=CW+1). Then, the process proceeds to step S90, which will be described below.

If it is determined that the signal Y1 does not have the same value as the current grayscale level CL, it is determined whether or not the difference between the current grayscale level CL and the previous grayscale level PL is 1. If it is determined that the difference between the current grayscale level CL and the previous grayscale level PL is not 1, this means not gradual changes. Then, the process proceeds to step S89.

If it is determined in step S86 that the difference between the current grayscale level CL and the previous grayscale level PL is 1, in step S87, the smooth-area detection processing unit 35 calculates an interpolation process starting point SS[SC]=CP−PW/2, where CP denotes the coordinate of a grayscale change point, TH denotes the threshold value, and QB denotes the quantized value (for example, in the example shown in FIG. 8, the threshold value TH is set to 4 (TH=4) and the quantized value QB is set to 1 (QB=1)), and determines an interpolation process gradient SD[SC] by calculating (CL−PL)×(PW+CW)×QB/(2×TH). Then, the smooth-area detection processing unit 35 writes the resulting values to the data memory 38.

Specifically, a value determined by subtracting ½ (or substantially ½) the previous continuous width PW from the change point CP is stored in the interpolation process starting point SS. In other words, in this process, an interpolation process starting point is equal to a center point of the previous continuous width PW regardless of the magnitude relationship between the current continuous width CW and the previous continuous width PW. A value determined by assigning a polarity, which is determined by the magnitude relationship between the current grayscale level CL and previous grayscale level PL, to a value determined by dividing ½ (or substantially ½) a sum of the current continuous width CW and the previous continuous width PW by the value TH/QB is stored in the interpolation process gradient SD. The range over which interpolation is performed starts from a point determined by subtracting ½ (or substantially ½) the previous continuous width PW from the change point CP to a point determined by adding ½ (or substantially ½) the current continuous width CW from the change point CP. In a case where regions to be interpolated are continuous, a series of straight lines connecting center points of individual grayscale values in the regions is used.

Then, in steps S88 to S92, processing basically similar to that of steps S50 to S54 shown in FIG. 12 is executed.

Specifically, after the processing of step S87 has been completed, the value [SC] of the counter indicating which interpolation process, as counted from the first one, is incremented by one. Thereafter or if it is determined that the difference between the current grayscale level CL and the previous grayscale level PL is not 1, the data is updated into CP=X, PL=CL, PW=CW, CL=Y1, and CW=0. After this processing or the processing of step S85 has been completed, the input signal Y is output to the line memory 36, and it is determined whether or not a pixel at the coordinate X is the last pixel on the current horizontal line. If it is determined that the pixel at the coordinate X is not the last pixel on the current horizontal line, the value of the coordinate X is incremented. Then, the process returns to step S83, and the subsequent processing is repeated. If it is determined that the pixel at the current coordinate X is the last pixel on the current horizontal line, the process ends.

With the process described above, an interpolation process starting point and interpolation gradient for executing an interpolation process are detected in the manner described with reference to FIG. 8.

In a case where a smooth-area detection process is executed using the smooth-area detection processing unit 35 in the manner described above, the image signal Y is supplied to the line memory 36, and the sequence data items SS and SD are supplied line-by-line to one of the first and second data memory units 51 and 52 in the data memory 38 for storage. Next, the smoothing process executed by the smoothing processing unit 40 in step S15 shown in FIG. 11 will be described with reference to a flowchart shown in FIG. 14.

In step S121, the smoothing processing unit 40 initializes parameters.

In step S122, the smoothing processing unit 40 determines whether or not a data enable signal is "1", that is, whether or not the current period is a video signal period. If it is determined in step S122 that the data enable signal is not "1", the process returns to step S121, and the subsequent processing is repeated.

If it is determined in step S122 that the data enable signal is "1", in step S123, the smoothing processing unit 40 obtains the input signal Y.

In step S124, the smoothing processing unit 40 determines whether or not a smooth switch flag SW is "1". The smooth switch flag SW is a flag that is set to "1" in a period for which an interpolation process is executed, and is set to "0" in an initialization state. For example, for a period until the first interpolation process starting point on the horizontal line currently being processed, the smooth switch flag SW is not "1". If it is determined in step S124 that the smooth switch flag SW is "1", the process proceeds to step S131, which will be described below.

If it is determined in step S124 that the smooth switch flag SW is not "1", in step S125, the smoothing processing unit 40 determines whether or not a point at the coordinate X is SS[SC], or the interpolation process starting point.

If it is determined in step S125 that the point at the coordinate X is not SS[SC], in step S126, the smoothing processing unit 40 sets the grayscale level TY currently being subjected to the interpolation process to that of the input image signal Y, and outputs the image signal Y. Then, the process proceeds to step S136, which will be described below.

If it is determined in step S125 that the point at the coordinate X is SS[SC], in step S127, the smoothing processing unit 40 determines whether or not the value of the interpolation process gradient SD is negative, or determines the polarity of the interpolation process gradient SD[SC].

If it is determined in step S127 that the value of the interpolation process gradient SD is negative, in step S128, the smoothing processing unit 40 sets a gradient polarity SP in the smoothing process to "−1".

If it is determined in step S127 that the value of the interpolation process gradient SD is not negative, in step S129, the smoothing processing unit 40 sets the gradient polarity SP in the smoothing process to "1".

After the processing of step S128 or S129 has been completed, in step S130, the smoothing processing unit 40 sets the smooth switch flag SW=1, a current correction process gradient CS=|SD[SC]|, a counter KC=0 for maintaining the current grayscale value during the interpolation process, an interpolation process stage counter LC=0, and the grayscale level TY currently being subjected to the interpolation process to that of the image signal Y. Specifically, the smoothing processing unit 40 turns on an interpolation process switch according to SW=1; substitutes the absolute value of the interpolation process gradient SD[SC] into the current correction process gradient CS; resets the value of the counter KC for maintaining the current grayscale value during the interpolation process and the interpolation process stage counter LC to 0; and substitutes the image signal Y into the grayscale level TY currently being subjected to the interpolation process. Then, the process proceeds to step S136, which will be described below.

If it is determined in step S124 that the smooth switch flag SW is "1", in step S131, the smoothing processing unit 40 compares the counter KC for maintaining the current grayscale value during the interpolation process with the current interpolation process gradient CS represented using the interpolation process gradient SD to determine whether or not KC<CS holds.

If it is determined in step S131 that KC<CS holds, in step S132, the smoothing processing unit 40 increments the counter KC for maintaining the current grayscale value during the interpolation process to set KC=KC+1, and holds the grayscale level currently being subjected to the interpolation process TY (TY=TY). Then, the process proceeds to step S136, which will be described below.

If it is determined in step S131 that KC<CS does not hold, in step S133, the smoothing processing unit 40 determines whether or not the interpolation process stage counter LC is equal to a value given by LC=TH/QB−1.

If it is determined in step S133 that the interpolation process stage counter LC is not equal to the value given by LC=TH/QB−1, in step S134, the smoothing processing unit 40 sets the grayscale level TY currently being subjected to the interpolation process to a value given by TY=TY+SP×QB, the interpolation process stage counter LC=LC+1, and the counter KC=0 for maintaining the current grayscale value during the interpolation process. Then, the process proceeds to step S136, which will be described below. Specifically, the value of the polarity SP having a magnitude equal to that of the quantized value QB is added to the current grayscale value to determine a subsequent grayscale value; the value of the interpolation process stage counter LC is increased by one; and the value of the counter KC is reset to 0.

If it is determined in step S133 that the interpolation process stage counter LC is equal to the value given by LC=TH/QB−1, in step S135, the smoothing processing unit 40 sets the value of the smooth switch flag SW to "0", and sets the grayscale level TY currently being subjected to the interpolation process to the value Y (TY=Y), and sets a counter value SC=SC+1 indicating which interpolation process, as counted from the first one. Then, the process proceeds to step S136, which will be described below.

After the processing of step S126, S130, S132, S134, or S135 has been completed, in step S136, the smoothing processing unit 40 outputs the level TY.

In step S137, the smoothing processing unit 40 determines whether or not a pixel at the coordinate X is the last pixel on the current horizontal line.

If it is determined in step S137 that the pixel at the coordinate X is not the last pixel on the current horizontal line, in step S138, the smoothing processing unit 40 increments the value of the coordinate X by one. Then, the process returns to step S123, and the subsequent processing is repeated. If it is determined in step S137 that the pixel at the coordinate X is the last pixel on the current horizontal line, the process ends.

With the process described above, for example, in the manner described with reference to FIGS. 9 and 10, an interpolation process is started at the coordinate stored in the sequence data item SS[SC], and an output image is reconstructed by using straight line interpolation that allows the approach to a subsequent grayscale value by steps of the value QB for every number of pixels stored in the sequence data SD[SC].

With the process described above, the image processing apparatus 11 can prevent the occurrence of an undesired striped pattern without causing defects such as flicker even if a distance between grayscale change points is significantly large.

The series of processes described above may be executed by hardware or software. The software is installed from a recording medium onto a computer having a program constituting the software incorporated in dedicated hardware thereof or a device capable of executing various functions by installing therein various programs, such as a general-purpose personal computer. The processes described above are executed by, for example, a personal computer 500 shown in FIG. 15.

Figure 15:
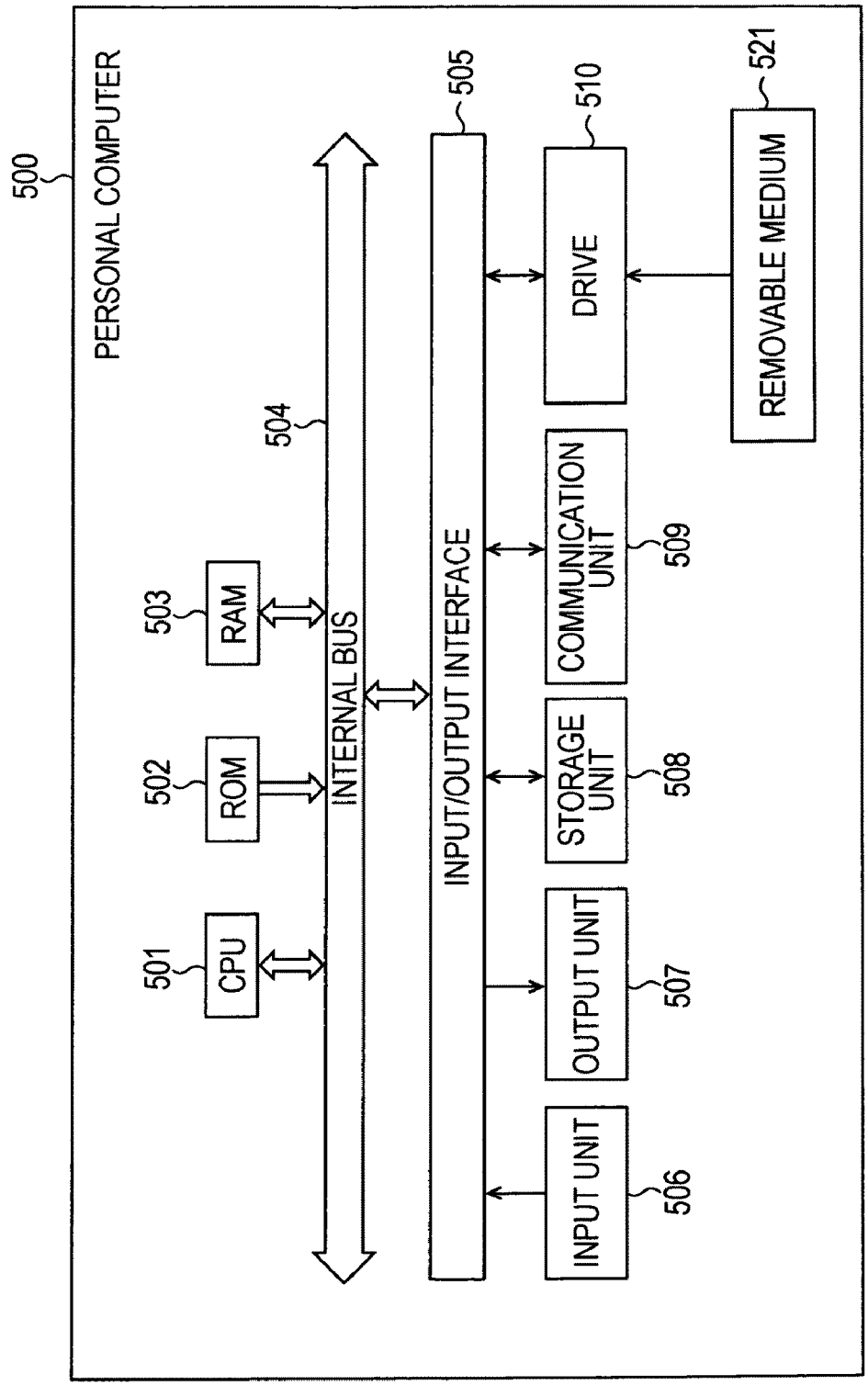
FIG. 15 is a block diagram showing a structure of a personal computer.

In FIG. 15, a central processing unit (CPU) 501 executes various processes according to a program stored in a read only memory (ROM) 502 or a program loaded from a storage unit 508 onto a random access memory (RAM) 503. The RAM 503 also stores data necessary for the CPU 501 to execute various processes and other suitable data as necessary.

The CPU 501, the ROM 502, and the RAM 503 are connected to one another via an internal bus 504. An input/output interface 505 is also connected to the internal bus 504.

The input/output interface 505 is connected to an input unit 506 including a keyboard and a mouse, an output unit 507 including a display such as a cathode ray tube (CRT) display or a liquid crystal display (LCD) and speakers, the storage unit 508, such as a hard disk, and a communication unit 509 including a modem and a terminal adapter. The communication unit 509 performs a communication process via various networks including a telephone line and a cable television (CATV) network.

The input/output interface 505 is also connected to a drive 510 as necessary, to which a removable medium 521 such as a magnetic disk, an optical disk, a magneto-optical disk, or a semiconductor memory is attached as desired. A computer program read from the removable medium 521 is installed onto the storage unit 508 as necessary.

In a case where the series of processes is executed by software, a program constituting the software is installed via a network or a recording medium.

The recording medium may be, as shown in FIG. 15, formed of packaged media including the removable medium 521 having the program recorded thereon, which is distributed separately from the computer 500 to provide a user with the program, or may also be formed of the ROM 502, a hard disk including the storage unit 508, or any other suitable device having the program recorded thereon, which is provided to a user in a manner being pre-installed in the main body of the computer 500.

In this specification, steps defining a program recorded on a recording medium may include processes that are executed sequentially in the order described herein, and also include processes that are executed in parallel or individually, not necessarily sequentially.

The term "system", as used herein, refers to an entire apparatus composed of a plurality of apparatuses.

Embodiments of the present invention are not limited to the embodiment described above, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
computation means for determining an interpolation process starting point and an interpolation process gradient by
comparing, when an image signal has a change point at which a difference between pixels values of adjacent pixels of the image signal is greater than zero and is less than or equal to a predetermined threshold value, a first continuous width of identical grayscale value pixels scanned earlier than the change point with a second continuous width of identical grayscale value pixels scanned later than the change point to determine a comparison result, when the comparison result is the first continuous width is smaller than the second continuous width, a position of a pixel scanned earlier by substantially one-half the first continuous width than the change point as the interpolation process starting point, and determining the interpolation process gradient on the basis of a difference between pixel grayscale values before and after the change point and the first continuous width, and setting, when the comparison result is the first continuous width is greater than the second continuous width, a position of a pixel scanned earlier by substantially one-half the second continuous width than the change point as the interpolation process starting point, and determining the interpolation process gradient on the basis of a difference between pixel grayscale values before and after the change point and the second continuous width; and conversion means for converting pixel grayscale values of the image signal on the basis of the interpolation process starting point and interpolation process gradient determined by the computation means so that a grayscale change from the interpolation process starting point in the image signal has a value in accordance with the interpolation process gradient.

2. The image processing apparatus according to claim 1, wherein the image signal is a converted image signal obtained by converting an N-bit image signal into an M-bit image signal.

3. The image processing apparatus according to claim 2, wherein the predetermined threshold value is equal to a value represented by an (M−N)-th power of 2.

4. The image processing apparatus according to claim 1, further comprising horizontal-component noise removing means for removing a noise component in a horizontal direction of the image signal,
wherein the computation means executes a computation process on the basis of the image signal in which the noise component in the horizontal direction has been removed by the horizontal-component noise removing means.

5. The image processing apparatus according to claim 1, further comprising vertical-component noise removing means for removing a noise component in a vertical direction of the image signal,
wherein the computation means executes a computation process on the basis of the image signal in which the noise component in the vertical direction has been removed by the vertical-component noise removing means.

6. The image processing apparatus according to claim 1, further comprising two data storage means each capable of storing computation results for every horizontal line which are obtained by the computation means,
wherein the computation means and the conversion means execute processing of the image signal for every horizontal line, and
wherein when one of the two data storage means is recording computation results obtained by the computation means, the conversion means converts pixel values of the image signal using computation results for a preceding horizontal line which are obtained by the computation means and which are stored in the other data storage means.

7. An image processing method for an image processing apparatus that executes image processing to provide display of an image signal, comprising the steps of:

obtaining an image signal;

determining whether or not the image signal has a change point at which a difference between pixel values of adjacent pixels of the image signal is greater than zero and is less than or equal to a predetermined threshold value;

comparing, when the image signal has the change point, a first continuous width of identical grayscale value pixels scanned earlier than the change point with a second continuous width of identical grayscale value pixels scanned later than the change point to determine a comparison result;

when the comparison result is the first continuous width is smaller than the second continuous width, a position of a pixel scanned earlier by substantially one-half the first continuous width than the change point as an interpolation process starting point, and determining an interpolation process gradient on the basis of a difference between pixel grayscale values before and after the change point and the first continuous width;

setting, when the comparison result is the first continuous width is greater than the second continuous width, a position of a pixel scanned earlier by substantially one-half the second continuous width than the change point as an interpolation process starting point, and determining an interpolation process gradient on the basis of a difference between pixel grayscale values before and after the change point and the second continuous width; and converting pixel grayscale values of the image signal on the basis of the obtained interpolation process starting point and interpolation process gradient so that a grayscale change from the interpolation process starting point in the image signal has a value in accordance with the interpolation process gradient.

8. A non-transitory storage medium on which is recorded a computer readable program for causing a computer to execute image processing to provide display of an image signal, the program causing the computer to execute a process comprising the steps of:

obtaining an image signal;

determining whether or not the image signal has a change point at which a difference between pixel values of adjacent pixels of the image signal is greater than zero and is less than or equal to a predetermined threshold value;

comparing, when the image signal has the change point, a first continuous width of identical grayscale value pixels scanned earlier than the change point with a second continuous width of identical grayscale value pixels scanned later than the change point to determine a comparison result;

when the comparison result is the first continuous width is smaller than the second continuous width, a position of a pixel scanned earlier by substantially one-half the first continuous width than the change point as an interpolation process starting point, and determining an interpolation process gradient on the basis of a difference between pixel grayscale values before and after the change point and the first continuous width;

setting, when the comparison result is the first continuous width is greater than the second continuous width, a position of a pixel scanned earlier by substantially one-half the second continuous width than the change point as an interpolation process starting point, and determining an interpolation process gradient on the basis of a difference between pixel grayscale values before and after the change point and the second continuous width; and converting pixel grayscale values of the image signal on the basis of the obtained interpolation process starting point and interpolation process gradient so that a grayscale change from the interpolation process starting point in the image signal has a value in accordance with the interpolation process gradient.

9. An image processing apparatus comprising:

a computation unit configured to determine an interpolation process starting point and an interpolation process gradient by comparing, when an image signal has a change point at which a difference between pixel values of adjacent pixels of the image signal is greater than zero and is less than or equal to a predetermined threshold value, a first continuous width of identical grayscale value pixels scanned earlier than the change point with a second continuous width of identical grayscale value pixels scanned later than the change point to determine a comparison result, when the comparison result is the first continuous width is smaller than the second continuous width, a position of a pixel scanned earlier by substantially one-half the first continuous width than the change point as the interpolation process starting point, and determining the interpolation process gradient on the basis of a difference between pixel grayscale values before and after the change point and the first continuous width, and setting, when the comparison result is the first continuous width is greater than the second continuous width, a position of a pixel scanned earlier by substantially one-half the second continuous width than the change point as the interpolation process starting point, and determining the interpolation process gradient on the basis of a difference between pixel grayscale values before and after the change point and the second continuous width; and a conversion unit configured to convert pixel grayscale values of the image signal on the basis of the interpolation process starting point and interpolation process gradient determined by the computation unit so that a grayscale change from the interpolation process starting point in the image signal has a value in accordance with the interpolation process gradient.

* * * * *